(12) United States Patent
Shibamoto et al.

(10) Patent No.: US 12,379,525 B2
(45) Date of Patent: Aug. 5, 2025

(54) PLASTIC LENS

(71) Applicant: DAICEL CORPORATION, Osaka (JP)

(72) Inventors: Akihiro Shibamoto, Tokyo (JP); Takashi Yoshimura, Himeji (JP)

(73) Assignee: DAICEL CORPORATION, Osaka (JP)

( * ) Notice: Subject to any disclaimer, the term of this patent is extended or adjusted under 35 U.S.C. 154(b) by 121 days.

(21) Appl. No.: 16/646,416

(22) PCT Filed: Sep. 6, 2018

(86) PCT No.: PCT/JP2018/033898
§ 371 (c)(1),
(2) Date: Mar. 11, 2020

(87) PCT Pub. No.: WO2019/054424
PCT Pub. Date: Mar. 21, 2019

(65) Prior Publication Data
US 2020/0284950 A1    Sep. 10, 2020

(30) Foreign Application Priority Data

Sep. 12, 2017  (JP) .................................. 2017-175239

(51) Int. Cl.
*C09D 183/06* (2006.01)
*C09D 5/00* (2006.01)
(Continued)

(52) U.S. Cl.
CPC ............... *G02B 1/14* (2015.01); *C09D 5/006* (2013.01); *C09D 183/06* (2013.01); *G02C 7/12* (2013.01)

(58) Field of Classification Search
CPC .......... G02B 1/14; G02B 1/041; G02B 1/115; G02B 5/08; G02B 5/30; C09D 5/006;
(Continued)

(56) References Cited

U.S. PATENT DOCUMENTS

2006/0066947 A1*  3/2006 Henry .................... G02B 5/305
                                                                       359/487.02
2008/0094707 A1*  4/2008 Tsukane ............... G02B 5/3033
                                                                       359/507
(Continued)

FOREIGN PATENT DOCUMENTS

EP      2 584 386 A1    4/2013
JP      57-38863 A      3/1982
(Continued)

OTHER PUBLICATIONS

English machine translation of JP-2009042351 (2009).*
(Continued)

Primary Examiner — Michael B Nelson
(74) Attorney, Agent, or Firm — Birch, Stewart, Kolasch & Birch, LLP

(57) ABSTRACT

The present invention aims at providing a plastic lens having excellent heat resistance and durability in which generation of cracks is suppressed even in high-temperature environments or when a mechanical stress being applied, and has excellent surface hardness and scratch resistance. The present invention provides a plastic lens containing a plastic lens substrate, a layer formed on at least one surface of the plastic lens substrate, and a vapor deposition coated film formed on at least one surface of the hard coating layer, the hard coating layer being a cured product of a curable composition containing a polyorganosilsesquioxane, the polyorganosilsesquioxane containing a constituent unit represented by Formula (1), a constituent unit represented by Formula (I), (Continued)

hard coating a constituent unit represented by (II), and a constituent unit represented by Formula (4); wherein a molar ratio of the constituent unit represented by Formula (I) and the constituent unit (II) represented by Formula (II) is 5 or greater and 500 or less, a ratio of the constituent unit represented by Formula (1) and the constituent unit represented by Formula (4) relative to the total amount (100 mol %) of siloxane constituent units is from 55 to 100 mol %; a number average molecular weight is from 1000 to 50000; and a molecular weight dispersity (a weight average molecular weight/a number average molecular weight) is from 1.0 to 4.0.

[Chem. 1]

$$[R^1SiO_{3/2}] \tag{1}$$

[Chem. 2]

$$[R^aSiO_{3/2}] \tag{I}$$

[Chem. 3]

$$[R^bSiO_{2/2}(OR^c)] \tag{II}$$

[Chem. 4]

$$[R^1SiO_{2/2}(OR^c)] \tag{4}$$

16 Claims, 3 Drawing Sheets

(51) Int. Cl.
  *G02B 1/14* (2015.01)
  *G02C 7/12* (2006.01)
(58) Field of Classification Search
  CPC ...... C09D 183/06; C09D 183/04; G02C 7/12; G02C 7/02; G02C 7/10; G02C 2202/16; C08G 77/14; C08G 77/045; C08G 59/32; C09J 183/04; C09J 5/06; C09J 11/06; C09J 2301/408; C09J 2203/326; C09J 2463/00; C09J 2483/00; C09J 2483/003; C09J 183/06; C09J 7/30; C09J 163/00; C09J 7/20; B32B 7/12; B32B 27/00; C08K 5/5435
  See application file for complete search history.

(56) References Cited

U.S. PATENT DOCUMENTS

| | | | | |
|---|---|---|---|---|
| 2010/0249265 | A1* | 9/2010 | Engardio | G02B 1/113 523/107 |
| 2011/0189470 | A1* | 8/2011 | Iizuka | C09D 133/08 428/323 |
| 2015/0275043 | A1* | 10/2015 | Kikuchi | C09D 183/04 428/447 |
| 2016/0083559 | A1* | 3/2016 | Yamasaki | G02B 1/041 525/426 |
| 2016/0297933 | A1 | 10/2016 | Kuwana et al. | |
| 2018/0282485 | A1 | 10/2018 | Kuwana et al. | |
| 2019/0302508 | A1* | 10/2019 | Lee | G02F 1/13439 |

FOREIGN PATENT DOCUMENTS

| | | | | |
|---|---|---|---|---|
| JP | 2002-129102 A | | 5/2000 | |
| JP | 2007-127681 A | | 5/2007 | |
| JP | 2009042351 A | * | 2/2009 | |
| JP | 2009-256563 A | | 11/2009 | |
| JP | 2015-212353 A | | 11/2015 | |
| WO | WO-2015020368 A2 | * | 2/2015 | ......... G02B 27/0006 |

OTHER PUBLICATIONS

Kim article JI Phys Chem B vol. 112 No. 51 (2008).*
International Search Report issued Dec. 11, 2018, in PCT/JP2018/033898.
Written Opinion of the International Searching Authority mailed Dec. 11, 2018, in PCT/JP2018/033898.
Extended European Search Report issued May 18, 2021, in European Patent Application No. 18855904.1.
Office Action issued Dec. 7, 2021, in Chinese Patent Application No. 201880059224.6, Chinese only.

* cited by examiner

PLASTIC LENS

TECHNICAL FIELD

The present invention relates to plastic lenses used in eyeglasses, sunglasses, and the like. More specifically, it relates to a plastic lens having a plastic lens substrate, a hard coating layer formed on a surface of the plastic lens substrate, and a vapor deposition coated film of a metal oxide or the like, formed on a surface of the hard coating layer. The present application claims priority from JP 2017-175239 filed in Japan on Sep. 12, 2017, the content of which is incorporated herein.

BACKGROUND ART

In general, a hard coating layer is formed on the surface of a plastic lens used in eyeglasses, sunglasses, and the like, to provide scratch resistance, and further an antireflective coating for preventing reflection of light and a mirror film having a reflection increasing effect and a design effect are formed.

The antireflective coating is formed by laminating a plurality of thin layers containing an inorganic material such as a metal oxide by a vacuum vapor deposition method, a sputtering method, or the like. The antireflective coating is referred to as an AR (antireflection) coating. The AR coating has a structure in which a low refractive layer and a high refractive layer are layered in an alternating order, and the multilayer structure provide optical characteristics of mitigating the reflected light itself by utilizing interference between incident light and reflected light (phase inversion due to thin films). The AR coating is often applied to the concave surface side of a lens.

In addition, the mirror film having the above-described reflection enhancing effect is referred to as a mirror coating, and is formed by laminating a plurality of thin film layers containing a metal oxide and a metal material by vacuum vapor deposition, sputtering, or the like. The mirror coating is often applied to the convex side of a lens.

However, plastic lenses having an AR coating or mirror coating (hereinafter, sometimes referred to as "vapor deposition coated film") have severe drawbacks in which cracks are generated due to heat or mechanical stress. For example, when eyeglasses, in which a hard coating layer is formed on a plastic lens surface using a silicone-based hard coating agent containing a polycondensate of methyltriethoxysilane or the like (for example, Patent Document 1), on which the vapor deposition coated film described above is formed, are left in a high temperature environment, for example, on a dashboard of a vehicle under blazing sun, or the eyeglasses are used in a relatively hard environment, cracks may be generated on the surface of the lens, which leads to a poor appearance (see Comparative Examples described below). Furthermore, when the cracks are generated, the sweat and moisture may pass through them, causing delamination of the vapor deposition coated films.

There are several factors that cause cracking in the vapor deposition coated film at high temperatures or mechanical stress, and a big factor may be the difference in a thermal expansion coefficient between the hard coating layer and the vapor deposition coated film or a tensile stress caused by an external force.

According to the investigations by the present inventors, cracks are first generated in the vapor deposition coated film layer. However, because a thickness of the vapor deposition coated film is not greater than the visual limit, these cracks do not result in poor appearance. However, the present inventors confirmed that when the cracks in the vapor deposition coated film layer cause propagation of the cracks to the hard coating layer, the cracks can be visible, and thus the appearance is impaired.

In a related art, attempts have been made to suppress the crack generation by devising the configuration of the vapor deposition coated film. For example, Patent Document 2 discloses a technology to prevent the generation of cracks providing a plastic lens having seven or more AR coatings, a refractive index layer that is a third layer from the lens substrate is a low refractive index $SiO_2$ layer; the third refractive index layer is thicker than other layers; the sum of the film thicknesses of the first to the third refractive index layers is from 180 to 220 nm; and the third refractive index layer is a buffer layer for layers formed toward outside relative to the fourth refractive index layer. Furthermore, a technology to prevent the generation of cracks is known in which an organic layer is interposed in a vapor deposition coated film having a multilayer structure, and the organic layer functions as a buffer layer to mitigate a difference in a thermal expansion.

However, such approaches by the modification of the vapor deposition coated film lead to a significant increase in cost because very complex processing steps are required, and the anti-reflection function, reflection enhancement function, and the like originally intended may be reduced.

CITATION LIST

Patent Document

Patent Document 1: JP 57-38863 A
Patent Document 2: JP 2007-127681 A

SUMMARY OF INVENTION

Technical Problem

Therefore, an object of the present invention is to provide a plastic lens having excellent heat resistance and durability, in which crack generation is suppressed even in high-temperature environments or when mechanical stress is applied, and the plastic lens having excellent surface hardness and scratch resistance.

Solution to Problem

As a result of diligent research to solve the above problems, the present inventors have found that when a curable composition (hard coating agent) is used as a resin material that forms a hard coating layer of a plastic lens, the curable composition including a polyorganosilsesquioxane, which has a silsesquioxane constituent unit (unit structure) containing an alicyclic epoxy group; has ratios of specific structures (a ratio of a T3 form to a T2 form, and a ratio of silsesquioxane constituent units containing alicyclic epoxy groups) in specific ranges; and has number average molecular weight and molecular weight dispersity in specific ranges, the high surface hardness and the excellent scratch resistance are achieved. In addition, the present inventors surprisingly discovered that even if the plastic lens has a configuration of a typical vapor deposition coated film, which has not been subjected to a crack-preventing treatment, the plastic lens exhibits excellent heat resistance and durability, where cracks are not generated in the vapor deposition coated film and also in the hard coating layer even when the plastic lens is left at an elevated temperature of 90° C. or higher, or subjected to a mechanical stress. In the present invention, the present inventors found that employing a specific polyorganosilsesquioxane as a material for forming the hard coating layer can provide a plastic lens with excellent heat resistance and durability conveniently and economically, without subjecting the vapor deposition coated film layer to any special technology; and the present invention has been completed based on the findings.

The present invention provides a plastic lens containing a plastic lens substrate; a hard coating layer formed on at least one surface of the plastic lens substrate; and a vapor deposition coated film,
  the hard coating layer being a cured product of a curable composition containing a polyorganosilsesquioxane described below,
  the polyorganosilsesquioxane containing:
  a constituent unit represented by Formula (1) below:

[Chem. 1]

$$[R^1SiO_{3/2}] \quad (1)$$

where $R^1$ represents a group containing an alicyclic epoxy group; a constituent unit represented by Formula (I) below:

[Chem. 2]

$$[R^aSiO_{3/2}] \quad (I)$$

where $R^a$ represents a group containing an alicyclic epoxy group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom;
  a constituent unit represented by Formula (II) below:

[Chem. 3]

$$[R^bSiO_{2/2}(OR^c)] \quad (II)$$

where $R^b$ represents a group containing an alicyclic epoxy group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and a constituent unit represented by Formula (4) below:

[Chem 4]

$$[R^1SiO_{2/2}(OR^c)] \quad (4)$$

where $R^1$ is the same as in Formula (1), and $R^c$ is the same as in Formula (II); wherein
  a molar ratio of the constituent unit represented by Formula (I) and the constituent unit (II) represented by Formula (II), [(constituent unit represented by Formula (I)/(constituent unit represented by Formula (II)], is from 5 or greater and 500 or less,
  a proportion of the constituent unit represented by Formula (1) and the constituent unit represented by Formula (4) relative to the total amount (100 mol %) of siloxane constituent units is from 55 to 100 mol %;
  a number average molecular weight is from 1000 to 50000; and a molecular weight dispersity (a weight average molecular weight/a number average molecular weight) is from 1.0 to 4.0.

In the plastic lens described above, the polyorganosilsesquioxane may further contain a constituent unit represented by Formula (2) below:

[Chem. 5]

$$[R^2SiO_{3/2}] \quad (2)$$

$R^2$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.

In the plastic lens described above, the $R^2$ may be a substituted or unsubstituted aryl group.

In the plastic lens described above, the group containing the alicyclic epoxy group may be a group represented by Formula (1a) below:

[Chem. 6]

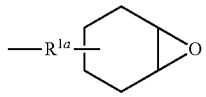
(1a)

where $R^{1a}$ represents a linear or branched alkylene group, or a group represented by Formula (1b) below:

[Chem. 7]

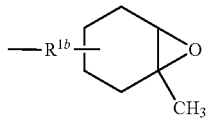
(1b)

where $R^{1b}$ represents a linear or branched alkylene group.

In the plastic lens described above, the curable composition may further contain a curing catalyst.

In the plastic lens described above, the curing catalyst may be a photocationic polymerization initiator.

In the plastic lens described above, the curing catalyst may be a thermal cationic polymerization initiator.

In the plastic lens described above, the curable composition may further contain a vinyl ether compound.

In the plastic lens described above, the curable composition may further contain a vinyl ether compound having a hydroxyl group in the molecule.

In the plastic lens described above, the vapor deposition coated film may be a mirror coating.

In the plastic lens described above, the vapor deposition coated film may be an antireflective coating.

In the plastic lens described above, the vapor deposition coated film may be a laminate of a plurality of inorganic layers.

In the plastic lens described above, the plastic lens substrate may contain a polyamide-based resin.

In the plastic lens described above, the plastic lens substrate may be a polarizing lens.

In the plastic lens described above, the plastic lens substrate is a polarizing lens having a polarizing film and a protective film laminated on at least one surface of the polarizing film, where the protective film may include a polyamide-based resin.

The plastic lens may be a lens for eyeglasses or sunglasses.

In addition, the present invention provides eyeglasses or sunglasses having the plastic lens.

Advantageous Effects of Invention

The plastic lens according to an embodiment of the present invention has the configuration described above, and thus the plastic lens exhibits high surface hardness and excellent scratch resistance, and has excellent heat resistance and durability in which even if the plastic lens is left at a high temperature of 90° C. or higher or subjected to a mechanical stress, the cracks are not generated. Furthermore, no special treatment is applied on the vapor deposition coated film as in the prior art, a plastic lens having excellent heat resistance and durability can be produced easily and economically. Therefore, the plastic lens according to an embodiment of the present invention can be suitably used as a lens for eyeglasses and sunglasses.

DESCRIPTION OF EMBODIMENTS

Plastic Lens

Figure 1:
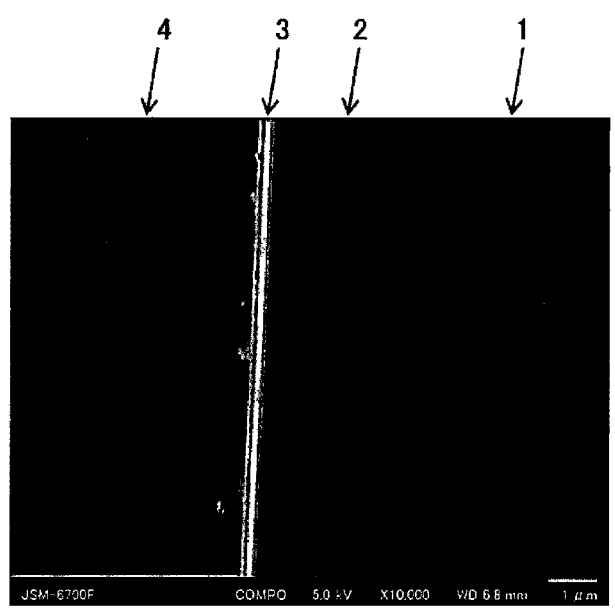
FIG. 1 is a scanning electron microscope (SEM) photograph of a cross section of a hard coating lens 1 with an AR layer after a heat treatment. (Example 1)

The plastic lens according to an embodiment of the present invention (in particular, plastic lens for eyeglasses or sunglasses) includes a plastic lens substrate; a hard coating layer formed on at least one surface of the plastic lens substrate; and a vapor deposition coated film formed on at least one surface of the hard coating layer, the hard coating layer being a cured product of a curable composition (hereinafter, also referred to as a "curable composition according to an embodiment of the present invention" or a "hard coating agent according to an embodiment of the present invention") including a polyorganosilsesquioxane (hereinafter, also referred to as a "polyorganosilsesquioxane according to an embodiment of the present invention").

The polyorganosilsesquioxane includes a constituent unit represented by Formula (1) below; a constituent unit represented by Formula (I) below; a constituent unit represented by Formula (II) below; and a constituent unit represented by Formula (4) below; where a molar ratio of the constituent unit represented by Formula (I) (which may be referred to as "T3 form") to the constituent unit represented by Formula (II) below (which may be referred to as "T2 form"), [(the constituent unit represented by Formula (I))/(the constituent unit represented by Formula (II)), or "T3 form/T2 form"], is 5 or more and 500 or less; a ratio (total amount) of the constituent unit represented by Formula (1) below and constituent unit represented by Formula (4) below relative to the total amount (100 mol %) of siloxane constituent units is from 55 to 100 mol %; a number average molecular weight is from 1000 to 50000 and a molecular weight dispersity [a weight average molecular weight/a number average molecular weight] is from 1.0 to 4.0.

[Chem. 8]

$[R^1SiO_{3/2}]$ (1)

[Chem. 9]

$[R^aSiO_{3/2}]$ (I)

[Chem. 10]

$[R^bSiO_{2/2}(OR^c)]$ (II)

Polyorganosilsesquioxane According to an Embodiment of the Present Invention

The constituent unit represented by Formula (1) in the polyorganosilsesquioxane according to an embodiment of the present invention is a silsesquioxane constituent unit (a so-called T unit) generally represented by $[RSiO_{3/2}]$. Here, R in the formula described above represents a hydrogen atom or a monovalent organic group, the same applying to the following. The constituent unit represented by Formula (1) above is formed by a hydrolysis and condensation reaction of a corresponding hydrolyzable trifunctional silane compound (specifically, a compound represented by Formula (a) described later, for example).

$R^1$ in Formula (1) represents a group (monovalent group) containing an alicyclic epoxy group. That is, the polyorganosilsesquioxane according to an embodiment of the present invention is a cationically curable compound including at least an alicyclic epoxy group in the molecule (cationically polymerizable compound). The term "alicyclic epoxy group" in the group containing the alicyclic epoxy group refers to an "epoxy group constituted by two adjacent carbon atoms forming the alicyclic ring (e.g. a cyclohexyl ring, a cyclopentyl ring, and the like) and an oxygen atom."

As the polyorganosilsesquioxane according to an embodiment of the present invention has the alicyclic epoxy group, the hard coating layer of the plastic lens according to an embodiment of the present invention exhibits better surface hardness, scratch resistance, heat resistance, dimensional stability, bendability, and the like compared to a case where a polyorganosilsesquioxane having an epoxy group other than the alicyclic epoxy group (for example, a glycidyl group) is used. In particular, the surface hardness and the scratch resistance are excellent. Examples of the group containing the alicyclic epoxy group are not particularly limited, and include groups containing a 3,4-epoxycyclohexyl group are preferable, from a viewpoint of curability of the curable composition, and surface hardness and heat resistance of the cured product (hard coating layer). The group represented by Formula (1a) below and the group represented by Formula (1b) below are more preferable, and the group represented by Formula (1a) below is even more preferable.

[Chem. 11]

(1a)

[Chem. 12]

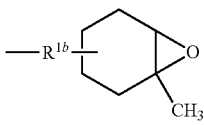
(1b)

In Formula (1a) above, $R^{1a}$ represents a linear or branched alkylene group. Examples of the linear or branched alkylene group include linear or branched alkylene groups having from 1 to 10 carbons, such as a methylene group, a methyl methylene group, a dimethyl methylene group, an ethylene group, a propylene group, a trimethylene group, a tetramethylene group, a pentamethylene group, a hexamethylene group, and a decamethylene group. Among these, in terms of surface hardness and curability of the cured product (the hard coating layer), $R^{1a}$ is preferably a linear alkylene group having from 1 to 4 carbons or a branched alkylene group having 3 or 4 carbons, more preferably an ethylene group, a trimethylene group, and a propylene group, and even more preferably an ethylene group and a trimethylene group.

In Formula (1b) above, $R^{1b}$ represents a linear or branched alkylene group, and the same groups as those of $R^{1a}$ are exemplified. Among these, from a viewpoint of surface hardness and curability of the cured product (the hard coating layer), $R^{1b}$ is preferably a linear alkylene group having from 1 to 4 carbons or a branched alkylene group having 3 or 4 carbons, more preferably an ethylene group, a trimethylene group, and a propylene group, and even more preferably an ethylene group and a trimethylene group.

$R^1$ in Formula (1) is particularly preferably a group represented by Formula (1a) above in which $R^{1a}$ is an ethylene group (especially, 2-(3,4-epoxycyclohexyl)ethyl group).

The polyorganosilsesquioxane according to an embodiment of the present invention may include only one type of constituent unit represented by Formula (1) above or may include two or more types of constituent units represented by Formula (1) above.

The polyorganosilsesquioxane according to an embodiment of the present invention may also include, as a silsesquioxane constituent unit [RSiO$_{3/2}$], a constituent unit represented by Formula (2) below, in addition to the constituent unit represented by Formula (1) above.

[Chem. 13]

$$[R^2SiO_{3/2}] \quad (2)$$

The constituent unit represented by Formula (2) above is a silsesquioxane constituent unit (T unit) generally represented by [RSiO$_{3/2}$]. That is, the constituent unit represented by Formula (2) above is formed by a hydrolysis and condensation reaction of a corresponding hydrolyzable trifunctional silane compound (specifically, for example, a compound represented by Formula (b) described later).

$R^2$ in Formula (2) represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. Examples of the aryl group include a phenyl group, a tolyl group, and a naphthyl group. Examples of the aralkyl group include a benzyl group and a phenethyl group. Examples of the cycloalkyl group include a cyclobutyl group, a cyclopentyl group, and a cyclohexyl group. Examples of the alkyl group include linear or branched alkyl groups, such as a methyl group, an ethyl group, a propyl group, an n-butyl group, an isopropyl group, an isobutyl group, an s-butyl group, a t-butyl group, and an isopentyl group. Examples of the alkenyl group include linear or branched alkenyl groups, such as a vinyl group, an allyl group, and an isopropenyl group.

Examples of the substituted aryl group, the substituted aralkyl group, the substituted cycloalkyl group, the substituted alkyl group, and the substituted alkenyl group described above include a group in which some or all of hydrogen atoms or a portion or the entirety of the backbone in each of the aryl group, the aralkyl group, the cycloalkyl group, the alkyl group, and the alkenyl group described above are substituted with at least one type selected from the group consisting of an ether group, an ester group, a carbonyl group, a siloxane group, a halogen atom (such as a fluorine atom), an acrylic group, a methacrylic group, a mercapto group, an amino group, and a hydroxy group (hydroxyl group).

Among these, $R^2$ is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

A ratio of each silsesquioxane constituent unit described above (the constituent unit represented by Formula (1) and the constituent unit represented by Formula (2)) in the polyorganosilsesquioxane according to an embodiment of the present invention can be appropriately adjusted by a composition of the raw materials (hydrolyzable trifunctional silanes) for forming these constituent units.

The polyorganosilsesquioxane according to an embodiment of the present invention may further include, in addition to the constituent unit represented by Formula (1) above and the constituent unit represented by Formula (2) above, at least one type of siloxane constituent unit selected from the group consisting of a silsesquioxane constituent unit [RSiO$_{3/2}$] other than the constituent unit represented by Formula (1) above and the constituent unit represented by Formula (2) above; a constituent unit represented by [R$_3$SiO$_{1/2}$] ("M unit"); a constituent unit represented by [R$_2$SiO$_{2/2}$] ("D unit"); and a constituent unit represented by [SiO$_{4/2}$] ("Q unit"). Here, examples of the silsesquioxane constituent unit other than the constituent unit represented by Formula (1) above and the constituent unit represented by Formula (2) above include a constituent unit represented by Formula (3) below.

[Chem. 14]

$$[HSiO_{3/2}] \quad (3)$$

A ratio of the constituent unit (T3 form) represented by Formula (I) above to the constituent unit (T2 form) represented by Formula (II) above, [T3 form/T2 form], in the polyorganosilsesquioxane according to an embodiment of the present invention is, as described above, 5 or more and 500 or less.

One preferred aspect of the polyorganosilsesquioxane according to an embodiment of the present invention (hereinafter, sometimes referred to as a "low molecular weight polyorganosilsesquioxane") has a [T3 form/T2 form] of 5 or more and less than 20. The lower limit thereof is preferably 5, more preferably 6, even more preferably 7, and the upper limit is preferably 18, more preferably 16, and even more preferably 14. Also, another preferred aspect of the polyorganosilsesquioxanes according to an embodiment of the present invention (hereinafter, sometimes referred to as a "high molecular weight polyorganosilsesquioxane") has a [T3 form/T2 form] of 20 or more and 500 or less. The lower limit thereof is preferably 21, more preferably 23, even more preferably 25, and the upper limit is preferably 100, more preferably 50, and even more preferably 40.

As the ratio [T3 form/T2 form] of the polyorganosilsesquioxane according to an embodiment of the present invention (including the low molecular weight polyorganosilsesquioxane and the high molecular weight polyorganosilsesquioxane) is controlled to the range described above, surface hardness, scratch resistance, and adhesion of the cured product (hard coating layer) tend to improve significantly.

The constituent unit represented by Formula (I) above is represented by Formula (I') below when described in more detail. Furthermore, the constituent unit represented by Formula (II) above is represented by Formula (II') below when described in greater detail. Three oxygen atoms bonded to the silicon atom illustrated in the structure represented by Formula (I') below are each bonded to another silicon atom (a silicon atom not illustrated in Formula (I')). On the other hand, two oxygen atoms located above and below the silicon atom illustrated in the structure represented by Formula (II') below are each bonded to another silicon atom (a silicon atom not illustrated in Formula (II')). That is, both the T3 form and the T2 form are constituent units (T units) formed by a hydrolysis and condensation reaction of a corresponding hydrolyzable trifunctional silane compound.

[Chem. 15]

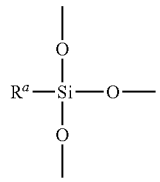

(I')

[Chem. 16]

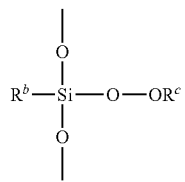

(II')

$R^a$ in Formula (I) above (also $R^a$ in Formula (I')) and $R^b$ in Formula (II) above (also $R^b$ in Formula (II')) each represent a group containing an alicyclic epoxy group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom. Specific examples of $R^a$ and $R^b$ include the same examples as those given for $R^1$ in Formula (1) above and $R^2$ in Formula (2) above. $R^a$ in Formula (I) and $R^b$ in Formula (II) are each derived from a group (a group other than an alkoxy group and a halogen atom; for example, $R^2$, and a hydrogen atom, and the like in Formulae (a) to (c) described later) bonded to a silicon atom in the hydrolyzable trifunctional silane compound used as a raw material for the polyorganosilsesquioxane according to an embodiment of the present invention.

$R^c$ in Formula (II) above (likewise, $R^c$ in Formula (II')) represents a hydrogen atom or an alkyl group having from 1 to 4 carbons. Examples of the alkyl group having from 1 to 4 carbons include linear or branched alkyl groups having from 1 to 4 carbons, such as a methyl group, an ethyl group, a propyl group, an isopropyl group, a butyl group, and an isobutyl group. The alkyl group in $R^c$ in Formula (II) is typically derived from an alkyl group that forms an alkoxy group (for example, an alkoxy group as $X^1$ to $X^3$ described later) in the hydrolyzable silane compound used as a raw material for the polyorganosilsesquioxane according to an embodiment of the present invention.

The ratio [T3 form/T2 form] in the polyorganosilsesquioxane according to an embodiment of the present invention can be determined, for example, by $^{29}$Si-NMR spectrum measurements. In the $^{29}$Si-NMR spectrum, the silicon atom in the constituent unit represented by Formula (I) above (T3 form) and the silicon atom in the constituent unit represented by Formula (II) above (T2 form) exhibit signals (peaks) at different positions (chemical shifts), and thus the ratio [T3 form/T2 form] above is determined by calculating a ratio of each integration of these peaks. Specifically, for example, when the polyorganosilsesquioxane according to an embodiment of the present invention is represented by Formula (1) above and $R^1$ has a constituent unit which is a 2-(3',4'-epoxycyclohexyl)ethyl group, the signal attributed to the silicon atom in the structure represented by Formula (I) above (T3 form) appears at −64 to −70 ppm, and the signal attributed to the silicon atom in the structure represented by Formula (II) above (T2 form) appears at −54 to −60 ppm. Thus, in this case, the ratio [T3 form/T2 form] can be determined by calculating the ratio of the integrated signal at −64 to −70 ppm (T3 form) and the integrated signal at −54 to −60 ppm (T2 form). In a case where $R^1$ is a group an alicyclic epoxy group other than the 2-(3,4-epoxycyclohexyl) ethyl group, the ratio [T3 form/T2 form] can be determined in the same manner as above.

The $^{29}$Si-NMR spectrum of the polyorganosilsesquioxane according to an embodiment of the present invention can be measured, for example, by using the following instrument and conditions.

Measuring instrument: "JNM-ECA500NMR" (trade name, available from JEOL Ltd.)
Solvent: Deuteriochloroform
Number of scans: 1800 scans
Measurement temperature: 25° C.

The ratio [T3 form/T2 form] of the polyorganosilsesquioxane according to an embodiment of the present invention of 5 or more and 500 or less means that the T2 form are present in a certain amount or greater, relative to the T3 form in the polyorganosilsesquioxane of the present invention. Examples of such a T2 form include a constituent unit represented by Formula (4) below, a constituent unit represented by Formula (5) below, and a constituent unit represented by Formula (6) below. $R^1$ in Formula (4) below and $R^2$ in Formula (5) below are the same as the $R^1$ in Formula (1) above and the $R^2$ in Formula (2) above, respectively. $R^c$ in Formulas (4) to (6) below represents a hydrogen atom or an alkyl group having from 1 to 4 carbons, similar to $R^c$ in Formula (II).

[Chem. 17]

$$[R^1SiO_{2/2}(OR^c)] \qquad (4)$$

[Chem. 18]

$$[R^2SiO_{2/2}(OR^c)] \qquad (5)$$

[Chem. 19]

$$[HSiO_{2/2}(OR^c)] \quad (6)$$

The polyorganosilsesquioxane according to an embodiment of the present invention may have any of a cage-type, an incomplete cage-type, a ladder-type, or a random-type silsesquioxane structure, or may have a combination of two or more of these silsesquioxane structures.

The ratio (total amount) of the constituent unit represented by Formula (1) above and the constituent unit represented by Formula (4) above relative to a total amount (100 mol %) of siloxane constituent units [all siloxane constituent units; total amount of M unit, D unit, T unit, and Q unit] in the polyorganosilsesquioxane according to an embodiment of the present invention is, as described above, from 55 to 100 mol %, preferably from 65 to 100 mol %, and more preferably from 80 to 99 mol %. When the ratio is set to 55 mol % or greater, the curability of the curable composition improves, and the surface hardness and the adhesion of the cured product (hard coating layer) significantly increase. In addition, the ratio of each siloxane constituent unit in the polyorganosilsesquioxane according to an embodiment of the present invention can be calculated, for example, from the composition of the raw materials and NMR spectrum measurements.

The ratio (total amount) of the constituent unit represented by Formula (2) above and the constituent unit represented by Formula (5) above relative to a total amount (100 mol %) of siloxane constituent units [all siloxane constituent units; total amount of M unit, D unit, T unit, and Q unit] in the polyorganosilsesquioxane according to an embodiment of the present invention is not particularly limited, but is preferably from 0 to 70 mol %, more preferably from 0 to 60 mol %, even more preferably from 0 to 40 mol %, and particularly preferably from 1 to 15 mol %. When the ratio is set to 70 mol % or less, the ratio of the constituent unit represented by Formula (1) and the constituent unit represented by Formula (4) can be relatively increased, and thus such a ratio tends to improve the curability of the curable composition and further increase the surface hardness and adhesion of the resulting cured product (hard coating layer). On the other hand, when the ratio is set to 1 mol % or greater, the gas barrier properties of the resulting cured product (hard coating layer) tends to improve.

The ratio (total amount) of the constituent unit represented by Formula (1) above, the constituent unit represented by Formula (2) above, the constituent unit represented by Formula (4) above, and the constituent unit represented by Formula (5) above relative to a total amount (100 mol %) of siloxane constituent units [all siloxane constituent units; total amount of M unit, D unit, T unit, and Q unit] in the polyorganosilsesquioxane according to an embodiment of the present invention is not particularly limited, but is preferably from 60 to 100 mol %, more preferably from 70 to 100 mol %, and even more preferably from 80 to 100 mol %. Setting the above ratio to 60 mol % or greater tends to further increase the surface hardness and adhesion of the resulting cured product (hard coating layer).

The number average molecular weight (Mn) of the polyorganosilsesquioxane according to an embodiment of the present invention, determined by a gel permeation chromatography, calibrated with standard polystyrene, is from 1000 to 50000, as described above. The preferred number average molecular weight (Mn) of the low molecular weight polyorganosilsesquioxane according to an embodiment of the present invention is from 1000 to 3000, more preferably from 1000 to 2800, and even more preferably from 1100 to 2600. The number average molecular weight (Mn) of the high molecular weight polyorganosilsesquioxane according to an embodiment of the present invention, determined by the gel permeation chromatography, calibrated with standard polystyrene, is preferably from 2500 to 50000, more preferably from 2800 to 10000, even more preferably from 3000 to 8000. By controlling the number average molecular weight of the polyorganosilsesquioxane according to an embodiment of the present invention (including the low molecular weight polyorganosilsesquioxane and the high molecular weight polyorganosilsesquioxane) to the range described above, the heat resistance, scratch resistance, and adhesion of the cured product (hard coating layer) further improve, and the miscibility with other components in the curable composition improves and the heat resistance of the cured product (hard coating layer) further improves.

The molecular weight dispersity (Mw/Mn) of the polyorganosilsesquioxane according to an embodiment of the present invention, determined by a gel permeation chromatography, calibrated with standard polystyrene, is, from 1.0 to 4.0, as described above. The molecular weight dispersity (Mw/Mn) of the low molecular weight polyorganosilsesquioxane according to an embodiment of the present invention is preferably from 1.0 to 3.0, more preferably from 1.1 to 2.0, even more preferably from 1.2 to 1.9. The molecular weight dispersity (Mw/Mn) of the high molecular weight polyorganosilsesquioxane according to an embodiment of the present invention is preferably from 1.0 to 4.0, more preferably from 1.1 to 3.0, even more preferably from 1.2 to 2.5. By controlling the molecular weight dispersity of the polyorganosilsesquioxane according to an embodiment of the present invention (including the low molecular weight polyorganosilsesquioxane and the high molecular weight polyorganosilsesquioxane) to the range described above, the surface hardness and adhesion of the cured product (hard coating layer) tend to be higher, and it is easily turned into liquid and the handling tends to be improved.

The number average molecular weight and the molecular weight dispersity of the polyorganosilsesquioxane according to an embodiment of the present invention (including the low molecular weight polyorganosilsesquioxane and the high molecular weight polyorganosilsesquioxane) can be measured by using the following instruments and conditions.

Measuring instrument: "LC-20AD" (trade name, available from Shimadzu Corporation)
Column: Shodex KF-801×2, KF-802, and KF-803 (available from Showa Denko K.K.)
Measurement temperature: 40° C.
Eluent: THF, sample concentration of 0.1 to 0.2 wt. %
Flow rate: 1 mL/min
Detector: UV-VIS detector (trade name "SPD-20A", available from Shimadzu Corporation)
Molecular weight: calibrated with standard polystyrene A 5% weight loss temperature ($T_{d5}$) of the polyorganosilsesquioxane according to an embodiment of the present invention in an air atmosphere is not particularly limited, and is preferably 330° C. or higher (for example, from 330 to 450° C.), more preferably 340° C. or higher, and even more preferably 350° C. or higher. When the 5% weight loss temperature is 330° C. or higher, the heat resistance of the cured product (hard coating layer) tends to be further improved. In particular, when the polyorganosilsesquioxane according to an embodiment of the present invention has a ratio [T3 form/T2 form] of 5 or greater and 500 or less, a number average molecular weight from 1000 to 50000, and a molecular weight dispersity from 1.0 to 4.0, the 5% weight loss temperature thereof is controlled to 330° C. or higher. Here, the 5% weight loss temperature is a temperature at which the weight decreases by 5% compared to a weight prior to heating when heated at a constant temperature increase, and is an indicator of heat resistance. The 5% weight loss temperature can be measured by thermogravimetric analysis (TGA) under conditions of a temperature increase rate of 5° C./min in air atmosphere.

The method for producing the polyorganosilsesquioxane according to an embodiment of the present invention is not particularly limited, and the polyorganosilsesquioxane can be produced by a well-known or commonly used polysiloxane production method. Examples include a method of subjecting one or more types of hydrolyzable silane compounds to hydrolysis and condensation. As the hydrolyzable silane compound, however, a hydrolyzable trifunctional silane compound (compound represented by Formula (a) below) for forming the constituent unit represented by the Formula (1) described above needs to be used as an essential hydrolyzable silane compound.

More specifically, for example, the polyorganosilsesquioxane according to an embodiment of the present invention can be produced by a method of hydrolysis and condensation of a compound represented by Formula (a) below, which is a hydrolyzable silane compound for forming a silsesquioxane constituent unit (T unit) in the polyorganosilsesquioxane according to an embodiment of the present invention, and additionally as necessary, a compound represented by Formula (b) below and a compound represented by Formula (c) below.

[Chem. 20]

(a)

[Chem. 21]

(b)

[Chem. 22]

(c)

The compound represented by Formula (a) above is a compound that forms a constituent unit represented by Formula (1) in the polyorganosilsesquioxane according to an embodiment of the present invention. $R^1$ in Formula (a) represents a group containing an alicyclic epoxy group, as in the case of $R^1$ in Formula (1) above. That is, $R^1$ in Formula (a) is preferably a group represented by Formula (1a) above and a group represented by Formula (1b) above, more preferably a group represented by Formula (1a) above, even more preferably a group represented by Formula (1a) above wherein $R^{1a}$ is an ethylene group (especially, a 2-(3,4-epoxycyclohexyl)ethyl group).

$X^1$ in Formula (a) above represents an alkoxy group or a halogen atom. Examples of the alkoxy group in $X^1$ include alkoxy groups having from 1 to 4 carbons, such as a methoxy group, an ethoxy group, a propoxy group, an isopropyloxy group, a butoxy group, and an isobutyloxy group. In addition, examples of the halogen atom in $X^1$ include a fluorine atom, a chlorine atom, a bromine atom, and an iodine atom. Among these, $X^1$ is preferably an alkoxy group, and more preferably a methoxy group and an ethoxy group. In addition, each of the three $X^1$ may be the same or different.

The compound represented by Formula (b) above is a compound that forms a constituent unit represented by Formula (2) in the polyorganosilsesquioxane according to an embodiment of the present invention. $R^2$ in Formula (b) represents, as in the case of $R^2$ in Formula (2) above, a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. That is, $R^2$ in Formula (b) is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

$X^2$ in Formula (b) above represents an alkoxy group or a halogen atom. Specific examples of $X^2$ include those exemplified as $X^1$. Among these, $X^2$ is preferably an alkoxy group, more preferably a methoxy group and an ethoxy group. In addition, each of the three $X^2$ may be the same or different.

The compound represented by Formula (c) above is a compound that forms a constituent unit represented by Formula (3) in the polyorganosilsesquioxane according to an embodiment of the present invention. $X^3$ in Formula (c) above represents an alkoxy group or a halogen atom. Specific examples of $X^3$ include those exemplified as $X^1$. Among these, $X^3$ is preferably an alkoxy group, and more preferably a methoxy group and an ethoxy group. In addition, each of the three $X^3$ each may be the same or different.

A hydrolyzable silane compound other than the compounds represented by Formulae (a) to (c) above may be used in combination as the hydrolyzable silane compound. Examples thereof include hydrolyzable trifunctional silane compounds other than the compounds represented by Formulae (a) to (c) above, hydrolyzable monofunctional silane compounds forming an M unit, hydrolyzable bifunctional silane compounds forming a D unit, and hydrolyzable tetrafunctional silane compounds forming a Q unit.

The usage amount and the composition of the hydrolyzable silane compound can be appropriately adjusted according to the desired structure of the polyorganosilsesquioxane according to an embodiment of the present invention. For example, the usage amount of the compound represented by Formula (a) above is not particularly limited but is preferably from 55 to 100 mol %, more preferably from 65 to 100 mol %, and even more preferably from 80 to 99 mol %, relative to a total amount (100 mol %) of the hydrolyzable silane compound that is used.

In addition, the usage amount of the compound represented by Formula (b) above is not particularly limited but is preferably from 0 to 70 mol %, more preferably from 0 to 60 mol %, even more preferably from 0 to 40 mol %, and particularly preferably from 1 to 15 mol %, relative to a total amount (100 mol %) of the hydrolyzable silane compound that is used.

Furthermore, the ratio (ratio of a total amount) of the compound represented by Formula (a) and the compound represented by Formula (b) relative to a total amount (100 mol %) of the hydrolyzable silane compound that is used is preferably from 60 to 100 mol %, more preferably from 70 to 100 mol %, and even more preferably from 80 to 100 mol %.

In addition, in a case where two or more types of the hydrolyzable silane compounds are used in combination, the hydrolysis and condensation reaction of these hydrolyzable silane compounds can be performed simultaneously or sequentially. The order of the reactions when performed sequentially is not particularly limited.

The hydrolysis and condensation reaction of the hydrolyzable silane compound may be performed in a single step or may be performed in two or more stages. For example, to efficiently produce the low molecular weight polyorganosilsesquioxanes, it is preferred to perform the hydrolysis and condensation reaction in a single step. To efficiently produce the high molecular weight polyorganosilsesquioxanes, it is preferred to perform the hydrolysis and condensation reaction in two or more steps (preferably two steps); that is, the hydrolysis and condensation reaction are preferably performed one or more times using the low molecular weight polyorganosilsesquioxane as a starting material. An aspect in which the hydrolysis and condensation reaction of the hydrolysable silane compound is performed in one step to form the low molecular weight polyorganosilsesquioxane, and then the low molecular weight polyorganosilsesquioxane is further subjected to the hydrolysis and condensation reaction to form the high molecular weight polyorganosilsesquioxane is explained below, but the method for producing the polyorganosilsesquioxane is not limited thereto.

When the hydrolysis and condensation reaction of the hydrolyzable silane compound is performed in two steps, it is preferable that the low molecular weight polyorganosilsesquioxane is obtained in a hydrolysis and condensation reaction of the first step, and then the low molecular weight polyorganosilsesquioxane is further subjected to the hydrolysis and condensation reaction in a second step, whereby the high molecular weight polyorganosilsesquioxane can be formed.

The hydrolysis and condensation reaction of the hydrolyzable silane compound in the first step can be performed in the presence or absence of a solvent. Among these, the hydrolysis and condensation reaction are preferably performed in the presence of a solvent. Examples of the solvent include aromatic hydrocarbons such as benzene, toluene, xylene, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. Among these, the solvent is preferably a ketone or an ether. In addition, one type of the solvent can be used alone, or two or more types thereof can be used in combination.

The usage amount of the solvent in the hydrolysis and condensation reaction of the first step is not particularly limited and can be appropriately adjusted in a range from 0 to 2000 parts by weight relative to 100 parts by weight of a total amount of the hydrolyzable silane compound, according to a desired reaction time or the like.

The hydrolysis and condensation reaction of the hydrolyzable silane compound of the first step is preferably performed in the presence of a catalyst and water. The catalyst may be an acid catalyst or an alkali catalyst, but an alkali catalyst is preferable to suppress the degradation of the alicyclic epoxy group. Examples of the acid catalyst include mineral acids such as hydrochloric acid, sulfuric acid, nitric acid, phosphoric acid, and boric acid; phosphate esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Examples of the alkali catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts (for example, acetates) such as lithium acetate, sodium acetate, potassium acetate, and cesium acetate; alkaline earth metal organic acid salts (for example, acetates) such as magnesium acetate; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines (tertiary amines) such as triethylamine, N-methylpiperidine, 1,8-diazabicyclo[5.4.0]undec-7-ene, and 1,5-diazabicyclo[4.3.0]non-5-ene; and nitrogen-containing heterocyclic aromatic compounds, such as pyridine, 2,2'-bipyridyl, and 1,10-phenanthroline. Here, one type of the catalyst can be used alone, or two or more types thereof can be used in combination. In addition, the catalyst can be used in a state of being dissolved or dispersed in water, a solvent, or the like.

The usage amount of the catalyst in the hydrolysis and condensation reaction of the first step is not particularly limited and can be appropriately adjusted in a range from 0.002 to 0.200 mol relative to a total amount of 1 mol of the hydrolyzable silane compound.

The usage amount of water during the hydrolysis and condensation reaction of the first step is not particularly limited and can be appropriately adjusted in a range from 0.5 to 20 mol relative to a total amount of 1 mol of the hydrolyzable silane compound.

The method for adding water in the hydrolysis and condensation reaction of the first step is not particularly limited, and the total amount (total usage amount) of water to be used may be added all at once or may be added sequentially. When water is added sequentially, it may be added continuously or intermittently.

For the reaction conditions for performing the hydrolysis and condensation reaction of the hydrolyzable silane compound in the first step, it is particularly important to select reaction conditions to achieve a ratio [T3 form/T2 form] of 5 or greater and less than 20 in the low molecular weight polyorganosilsesquioxane according to an embodiment of the present invention. The reaction temperature of the hydrolysis and condensation reaction of the first step is not particularly limited but is preferably from 40 to 100° C. and more preferably from 45 to 80° C. Controlling the reaction temperature to the above range tends to facilitate a more efficient control of the above [T3 form/T2 form] ratio to 5 or more and less than 20. In addition, the reaction time of the hydrolysis and condensation reaction of the first step is not particularly limited, but is preferably from 0.1 to 10 hours and more preferably from 1.5 to 8 hours. Furthermore, the hydrolysis and condensation reaction of the first step can be performed under normal pressure, or can be performed under increased pressure or reduced pressure. Here, the atmosphere when performing the hydrolysis and condensation reaction in the first step is not particularly limited, and for example, the reaction may be performed in any of an inert gas atmosphere such as a nitrogen atmosphere or an argon atmosphere, or in the presence of oxygen such as in the air. The hydrolysis and condensation reaction is preferably performed in an inert gas atmosphere.

The low molecular weight polyorganosilsesquioxane according to an embodiment of the present invention can be obtained by the hydrolysis and condensation reaction of the hydrolyzable silane compound in the first step. After the completion of the hydrolysis and condensation reaction in the first step, the catalyst is preferably neutralized to prevent the ring-opening of the alicyclic epoxy group. The low molecular weight polyorganosilsesquioxane according to an embodiment of the present invention may be separated and purified through, for example, a separation means such as water washing, acid washing, alkali washing, filtration, concentration, distillation, extraction, crystallization, recrystallization, or column chromatography, or a separation means of a combination thereof.

The low molecular weight polyorganosilsesquioxane, formed in the hydrolysis and condensation reaction of the first step, is subjected to the hydrolysis and condensation reaction of the second step, whereby the high molecular weight polyorganosilsesquioxane can be produced.

The hydrolysis and condensation reaction of the second step can be performed in the presence or absence of a solvent. When the hydrolysis and condensation reaction of the second step is performed in the presence of a solvent, a solvent given as an example with regard to the hydrolysis and condensation reaction of the first step can be used. As the solvent of the hydrolysis and condensation reaction in the second step, the low molecular weight polyorganosilsesquioxane containing the reaction solvent and extraction solvent of the hydrolysis and condensation reaction in the first step may be used as is or may be partially distilled away and used. In addition, one type of the solvent can be used alone, or two or more types thereof can be used in combination.

In a case where the solvent is used in the hydrolysis and condensation reaction of the second step, the usage amount thereof is not particularly limited, and may be appropriately adjusted to a range from 0 to 2000 parts by weight relative to 100 parts by weight of the low molecular weight polyorganosilsesquioxane, according to a desired reaction time or the like.

The hydrolysis and condensation reaction of the second step is preferably carried out in the presence of a catalyst and water. The catalyst for the hydrolysis and condensation reaction of the first step can be used as the catalyst above. To suppress the degradation of the alicyclic epoxy group such as ring opening of the alicyclic epoxy group, the catalyst is preferably an alkali catalyst, more preferably alkali metal hydroxides such as sodium hydroxide, potassium hydroxide, and cesium hydroxide; and alkali metal carbonates such as lithium carbonate, sodium carbonate, potassium carbonate, and cesium carbonate. Here, one type of the catalyst can be used alone, or two or more types thereof can be used in combination. In addition, the catalyst can be used in a state of being dissolved or dispersed in water, a solvent, or the like.

The amount of the catalyst used in the hydrolysis and condensation reaction of the second step is not particularly limited, and may be appropriately adjusted to a range of preferably from 0.01 to 10000 ppm, more preferably from 0.1 to 1000 ppm, relative to the low molecular weight polyorganosilsesquioxane (1000000 ppm).

The amount of water used in the hydrolysis and condensation reaction of the second step is not particularly limited, and may be appropriately adjusted to a range of preferably from 10 to 100000 ppm, more preferably from 100 to 20000 ppm, relative to the low molecular weight polyorganosilsesquioxane (1000000 ppm). In a case where the amount of water used is greater than 100000 ppm, the ratio [T3 form/T2 form] and the number average molecular weight of the high molecular weight polyorganosilsesquioxane may not be easily controlled to the predetermined ranges.

The method for adding the water in the hydrolysis and condensation reaction of the second step is not particularly limited, and the total amount of the water to be used (total usage amount) may be added all at once or may be added sequentially. When the water is added sequentially, it may be added continuously or intermittently.

As the reaction conditions for the hydrolysis and condensation reaction of the second step, it is particularly important to select reaction conditions to achieve a ratio [T3 form/T2 form] of 20 or greater and 500 or less in the high molecular weight polyorganosilsesquioxane. The reaction temperature of the hydrolysis and condensation reaction of the second step may vary depending on the catalyst that is used, and is not particularly limited, but is preferably from 5 to 200° C., and more preferably from 30 to 100° C. When the reaction temperature is controlled to the above range, the [T3 form/T2 form] ratio and the number average molecular weight tend to be more efficiently controlled to the desired ranges. In addition, the reaction time of the hydrolysis and condensation reaction of the second step is not particularly limited, but is preferably from 0.5 to 1000 hours, and more preferably from 1 to 500 hours.

Additionally, sampling may be performed at an appropriate time while the hydrolysis and condensation reaction are carried out within the reaction temperature range described above, and the reaction is carried out while the ratio [T3 form/T2 form] and the number average molecular weight are monitored, whereby the high molecular weight polyorganosilsesquioxane having the desired ratio [T3 form/T2 form] and number average molecular weight can be formed.

Furthermore, the hydrolysis and condensation reaction of the second step can be performed under normal pressure, or can be performed under increased pressure or reduced pressure. Here, the atmosphere when performing the hydrolysis and condensation reaction of the second step is not particularly limited, and, for example, the reaction may be performed in any of an inert gas atmosphere such as a nitrogen atmosphere or an argon atmosphere, or in the presence of oxygen such as in the air. The hydrolysis and condensation reaction is preferably performed in the inert gas atmosphere.

The high molecular weight polyorganosilsesquioxane according to an embodiment of the present invention can be obtained by the hydrolysis and condensation reaction of the second step. After the completion of the hydrolysis and condensation reaction of the second step, the catalyst is preferably neutralized to prevent the ring-opening of the alicyclic epoxy group. The high molecular weight polyorganosilsesquioxane may be separated and purified through, for example, a separation means such as water washing, acid washing, alkali washing, filtration, concentration, distillation, extraction, crystallization, recrystallization, or column chromatography, or a separation means of a combination thereof.

The polyorganosilsesquioxane according to an embodiment of the present invention includes the configuration described above, and thus a cured product (hard coating layer) having the high surface hardness and heat resistance, and the excellent flexibility and processability can be formed by curing the curable composition including the polyorganosilsesquioxane as an essential component. Furthermore, a cured product having excellent adhesion can be formed.

Curable Composition of the Present Invention (Hard Coating Agent)

The curable composition according to an embodiment of the present invention is a curable composition (curable resin composition) containing the polyorganosilsesquioxane according to an embodiment of the present invention described above as an essential component, and used as a hard coating agent for forming the hard coating layer of the plastic lens according to an embodiment of the present invention. A plastic lens, in which a hard coating layer is formed on a surface of a plastic lens substrate using the curable composition according to an embodiment of the present invention as a hard coating agent, and a vapor deposition coated film is formed on the hard coating layer, has excellent heat resistance and durability such that cracks are not observed in the vapor deposition coated film layer or the hard coating layer even if it is left to stand at an elevated temperature of 90° C. or higher or mechanical stress is applied to the plastic lens.

As described below, the curable composition (hard coating agent) according to an embodiment of the present invention may further contain other components such as a curing catalyst (in particular, a photocationic polymerization initiator), a surface conditioner, and a surface modifier.

Note that in the curable composition (hard coating agent) according to an embodiment of the present invention, one type of the polyorganosilsesquioxane according to an embodiment of the present invention may be used alone, or two or more types may be used in combination.

The content (blended amount) of the polyorganosilsesquioxane according to an embodiment of the present invention in the curable composition (hard coating agent) according to an embodiment of the present invention is not particularly limited, but is preferably 80 wt. % or greater and less than 100 wt. % relative to a total solid content (100 wt. %) of the curable composition excluding volatile components such as a solvent. The lower limit of the content of the polyorganosilsesquioxane according to an embodiment of the present invention is preferably 85 wt. %, more preferably 90 wt. %, even more preferably 94 wt. %, still more preferably 95 wt. %, particularly preferably 96 wt. %. By setting the content of the polyorganosilsesquioxane according to an embodiment of the present invention to 80 wt. % or more (preferably 85 wt. % or greater, more preferably 90 wt. % or greater, even more preferably 94 wt. % or greater, still more preferably 95 wt. % or greater, particularly preferably 96 wt. % or greater), the surface hardness and adhesion of the cured product (hard coating layer) are further improved, and cracks tend to be less likely to be generated in the vapor deposition coated film even if the plastic lens according to an embodiment of the present invention is left in a high temperature environment or mechanical stress is applied to the plastic lens. On the other hand, the upper limit of the polyorganosilsesquioxane according to an embodiment of the present invention is not particularly limited, but is preferably less than 100 wt. %, more preferably 99.8 wt. %, even more preferably 99.5 wt. %. By setting the content of the polyorganosilsesquioxane according to an embodiment of the present invention to less than 100 wt. % (preferably 99.8 wt. % or less, more preferably 99.5 wt. % or less), a curing catalyst can be contained, whereby the curing of the curable composition (hard coating agent) tends to be advanced more efficiently.

The ratio of the polyorganosilsesquioxane according to an embodiment of the present invention relative to the total amount (100 wt. %) of the cationically curable compounds contained in the curable composition (hard coating agent) according to an embodiment of the present invention is not particularly limited, but is preferably from 80 to 100 wt. %, more preferably from 85 to 98 wt. %, even more preferably from 90 to 95 wt. %. By setting the content of the polyorganosilsesquioxane according to an embodiment of the present invention to 70 wt. % or greater, the surface hardness and adhesion of the cured product (hard coating layer) tend to be further improved.

The curable composition (hard coating agent) according to an embodiment of the present invention preferably includes a curing catalyst. Especially, a photocationic polymerization initiator is preferably included as a curing catalyst because a curing time until the curable composition becomes tack free can be shortened.

The curing catalyst is a compound capable of initiating or accelerating a cationic polymerization reaction of a cationically curable compound such as the polyorganosilsesquioxane according to an embodiment of the present invention. The curing catalyst is not particularly limited, and examples thereof include polymerization initiators such as photocationic polymerization initiators (photoacid generating agents), and thermal cationic polymerization initiators (thermal acid generating agents).

Well-known or commonly used photocationic polymerization initiators can be used as the photocationic polymerization initiator, and examples thereof include a sulfonium salt (a salt of a sulfonium ion and an anion), an iodonium salt (a salt of an iodonium ion and an anion), a selenium salt (a salt of a selenium ion and an anion), an ammonium salt (a salt of an ammonium ion and an anion), a phosphonium salt (a salt of a phosphonium ion and an anion), and a salt of a transition metal complex ion and an anion. One type alone or two or more types thereof in combination can be used.

Examples of the sulfonium salt include a triarylsulfonium salt such as [4-(4-biphenylylthio)phenyl]-4-biphenylylphenyl sulfonium tris(pentafluoroethyl) trifluorophosphate, a triphenylsulfonium salt, a tri-p-tolylsulfonium salt, a tri-o-tolylsulfonium salt, a tris(4-methoxyphenyl)sulfonium salt, a 1-naphthyldiphenylsulfonium salt, a 2-naphthyldiphenylsulfonium salt, a tris(4-fluorophenyl)sulfonium salt, a tri-1-naphthylsulfonium salt, a tri-2-naphthylsulfonium salt, a tris(4-hydroxyphenyl)sulfonium salt, a diphenyl[4-(phenylthio)phenyl]sulfonium salt, and a 4-(p-tolylthio)phenyl di-(p-phenyl) sulfonium salt; a diarylsulfonium salt such as a diphenylphenacylsulfonium salt, a diphenyl 4-nitrophenacylsulfonium salt, a diphenylbenzylsulfonium salt, and a diphenylmethylsulfonium salt; a monoarylsulfonium salt such as a phenylmethylbenzylsulfonium salt, a 4-hydroxyphenylmethylbenzylsulfonium salt, and a 4-methoxyphenylmethylbenzylsulfonium salt; and a tri alkylsulfonium salt such as a dimethylphenacylsulfonium salt, a phenacyltetrahydrothiophenium salt, and a dimethylbenzylsulfonium salt.

As the diphenyl [4-(phenylthio)phenyl]sulfonium salt, for example, commercial products of diphenyl[4-(phenylthio)phenyl]sulfonium hexafluoroantimonate and diphenyl[4-(phenylthio)phenyl]sulfonium hexafluorophosphate can be used.

Examples of the iodonium salt include "UV9380C" (trade name, a bis(4-dodecylphenyl) iodonium=hexafluoroantimonate 45% alkyl glycidyl ether solution, available from Momentive Performance Materials Japan LLC), "RHODORSIL PHOTOINITIATOR 2074" (trade name, tetrakis(pentafluorophenyl)borate=[(1-methylethyl)phenyl](methylphenyl)iodonium, available from Rhodia Japan Ltd.), "WPI-124" (trade name, available from Wako Pure Chemical Industries, Ltd.), a diphenyliodonium salt, a di-p-tolyliodonium salt, a bis(4-dodecylphenyl)iodonium salt, and a bis(4-methoxyphenyl)iodonium salt. Examples of the selenium salt include a triarylselenium salt, such as a triphenylselenium salt, a tri-p-tolylselenium salt, a tri-o-tolylselenium salt, a tris(4-methoxyphenyl)selenium salt, and a 1-naphthyldiphenylselenium salt; a diarylselenium salt, such as a diphenylphenacylselenium salt, a diphenylbenzylselenium salt, and a diphenylmethylselenium salt; a monoarylselenium salt, such as a phenylmethylbenzylselenium salt; and a trialkylselenium salt, such as a dimethylphenacylselenium salt.

Examples of the ammonium salt include a tetraalkyl ammonium salt, such as a tetramethyl ammonium salt, an ethyltrimethyl ammonium salt, a diethyldimethyl ammonium salt, a triethylmethyl ammonium salt, a tetraethyl ammonium salt, a trimethyl-n-propyl ammonium salt, and a trimethyl-n-butyl ammonium salt; a pyrrolidium salt, such as an N,N-dimethylpyrrolidium salt and an N-ethyl-N-methylpyrrolidium salt; an imidazolinium salt, such as an N,N'-dimethylimidazolinium salt and an N,N'-diethylimidazolinium salt; a tetrahydropyrimidium salt, such as an N,N'-dimethyltetrahydropyrimidium salt and an N,N'-diethyltetrahydropyrimidium salt; a morpholinium salt, such as an N,N-dimethylmorpholinium salt and an N,N-diethylmorpholinium salt; a piperidinium salt, such as an N,N-dimethylpiperidinium salt and an N,N-diethylpiperidinium salt; a pyridinium salt, such as an N-methylpyridinium salt and an N-ethylpyridinium salt; an imidazolium salt, such as an N,N'-dimethylimidazolium salt; a quinolium salt, such as an N-methylquinolium salt; an isoquinolium salt, such as an N-methylisoquinolium salt; a thiazonium salt, such as a benzylbenzothiazonium salt; and an acrydium salt, such as a benzylacrydium salt.

Examples of the phosphonium salt include a tetraarylphosphonium salt, such as a tetraphenylphosphonium salt, a tetra-p-tolylphosphonium salt, and a tetrakis(2-methoxyphenyl)phosphonium salt; a tri arylphosphonium salt, such as a triphenylbenzylphosphonium salt; and a tetraalkylphosphonium salt, such as a triethylbenzylphosphonium salt, a tributylbenzylphosphonium salt, a tetraethylphosphonium salt, a tetrabutylphosphonium salt, and a tri ethylphenacylphosphonium salt.

Examples of the salt of the transition metal complex ion include a salt of a chromium complex cation, such as (η5-cyclopentadienyl)(η6-toluene)Cr+ and (η5-cyclopentadienyl)(η6-xylene)Cr+; and a salt of an iron complex cation, such as (η5-cyclopentadienyl)(η6-toluene)Fe+ and (η5-cyclopentadienyl)(η6-xylene)Fe+.

Examples of the anion constituting the salt described above include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, a sulfonate anion (such as a trifluoromethanesulfonate anion, a pentafluoroethanesulfonate anion, a nonafluorobutanesulfonate anion, a methanesulfonate anion, a benzenesulfonate anion, and a p-toluenesulfonate anion), $(CF_3SO_2)_3C^-$, $(CF_3SO_2)_2N^-$, a perhalogenate ion, a halogenated sulfonate ion, a sulfate ion, a carbonate ion, an aluminate ion, a hexafluorobismuthate ion, a carboxylate ion, an arylborate ion, a thiocyanate ion, and a nitrate ion.

Examples of the thermal cationic polymerization initiator include arylsulfonium salts, aryliodonium salts, allene-ion complexes, quaternary ammonium salts, aluminum chelates, and boron trifluoride amine complexes.

Examples of the arylsulfonium salt include hexafluoroantimonate salts and the like. In the curable composition according to an embodiment of the present invention, commercially available products such as, for example, "SP-66" and "SP-77" (trade names, available from ADEKA Corporation); "SAN-AID SI-60L", "SAN-AID SI-80 L", "SAN-AID SI-100L" and "SAN-AID SI-150 L" (trade names, available from Sanshin Chemical Industry Co., Ltd.) can be used. Examples of the aluminum chelate include ethylacetoacetate aluminum diisopropylate and aluminum tris(ethylacetoacetate). Examples of the boron trifluoride amine complex include a boron trifluoride monoethyl amine complex, a boron trifluoride imidazole complex, and a boron trifluoride piperidine complex.

Note that, in the curable composition (hard coating agent) according to an embodiment of the present invention, one type of the curing catalyst may be used alone, or two or more types may be used in combination.

The content (blended amount) of the curing catalyst in the curable composition (hard coating agent) according to an embodiment of the present invention is not particularly limited, and preferably from 0.01 to 10.0 parts by weight, more preferably from 0.05 to 7.5 parts by weight, even more preferably from 0.1 to 6.0 parts by weight (for example, from 0.3 to 6.0 parts by weight), based on 100 parts by weight of the polyorganosilsesquioxane according to an embodiment of the present invention. By setting the content of the curing catalyst to 0.01 parts by weight or more, the curing reaction can be efficiently and sufficiently advanced, and the surface hardness and adhesion of the resulting cured product (hard coating layer) tend to be improved. On the other hand, by setting the content of the curing catalyst to 10.0 parts by weight or less, the storage properties of the curable composition (hard coating agent) is further improved and the coloration of the resulting cured product (hard coating layer) tends to be suppressed.

The curable composition (hard coating agent) may further include a cationically curable compound other than the polyorganosilsesquioxane according to an embodiment of the present invention (which may be referred to as an "additional cationically curable compound"). The additional cationically curable compound is not particularly limited, and a well known or commonly used cationically curable compound can be used. Examples thereof include an epoxy compound other than the polyorganosilsesquioxane according to an embodiment of the present invention (which may be referred to as an "additional epoxy compound"), an oxetane compound, and a vinyl ether compound. Here, in the curable composition (the hard coating agent) according to an embodiment of the present invention, one type of the other cationically curable compound may be used alone, or two or more types thereof may be used in combination.

The additional epoxy compound is not particularly limited, and a well known or commonly used compound including one or more epoxy groups (oxirane rings) in the molecule can be used. Examples thereof include alicyclic epoxy compounds (alicyclic epoxy resins), aromatic epoxy compounds (aromatic epoxy resins), and aliphatic epoxy compounds (aliphatic epoxy resins).

The alicyclic epoxy compound is not particularly limited and may include well-known or commonly used compounds that have one or more alicyclic rings and one or more epoxy groups in the molecule. Examples thereof include, for example, (1) a compound including the alicyclic epoxy group in the molecule; (2) a compound in which the epoxy group is directly bonded to the alicyclic ring with a single bond; and (3) a compound including the alicyclic ring and the glycidyl ether group in the molecule (a glycidyl ether type epoxy compound).

Examples of the compound (1) having an alicyclic epoxy group in the molecule include a compound represented by Formula (i) below.

[Chem. 23]

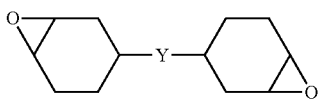

(i)

In Formula (i) above, Y represents a single bond or a linking group (a divalent group having one or more atoms). Examples of the linking group include divalent hydrocarbon groups, alkenylene groups in which some or all of the carbon-carbon double bonds are epoxidized, carbonyl groups, ether bonds, ester bonds, carbonate groups, amide groups, and groups in which a plurality thereof are linked.

Examples of the divalent hydrocarbon group include linear or branched alkylene groups having from 1 to 18 carbons and divalent alicyclic hydrocarbon groups. Examples of the linear or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group include a divalent cycloalkylene group (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the alkenylene group in which some or all of the carbon-carbon double bonds are epoxidized (which may be referred to as an "epoxidized alkenylene group") include linear or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an alkenylene group in which all of the carbon-carbon double bonds are epoxidized; and more preferably an alkenylene group having from 2 to 4 carbons in which all of the carbon-carbon double bonds are epoxidized.

Representative examples of the alicyclic epoxy compound represented by Formula (i) above include (3,4,3',4'-diepoxy)bicyclohexyl and compounds represented by Formulae (i-1) to (i-10) below. In Formulae (i-5) and (i-7) below, 1 and m each represent an integer from 1 to 30. R' in Formula (i-5) below is an alkylene group having from 1 to 8 carbons, and, among these, a linear or branched alkylene group having from 1 to 3 carbons, such as a methylene group, an ethylene group, a propylene group, or an isopropylene group, is preferable. In Formulae (i-9) and (i-10) below, n1 to n6 each represent an integer from 1 to 30. In addition, examples of the alicyclic epoxy compound represented by Formula (i) above include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl)ether.

[Chem. 24]

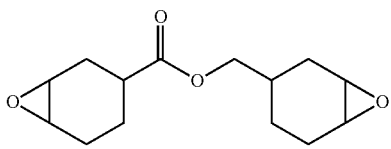

(i-1)

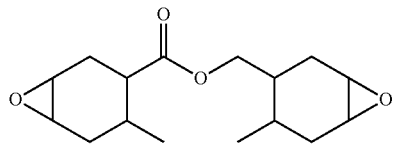

(i-2)

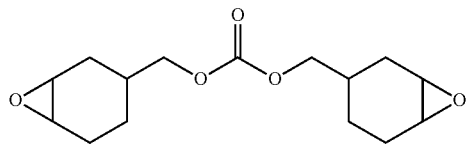

(i-3)

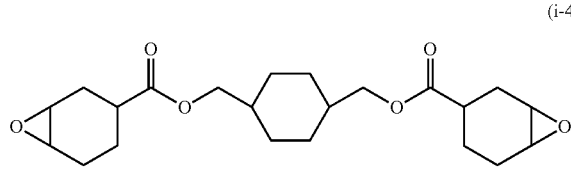

(i-4)

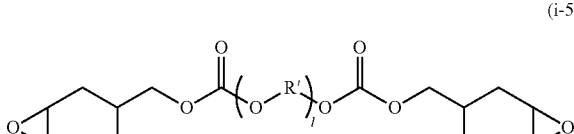

(i-5)

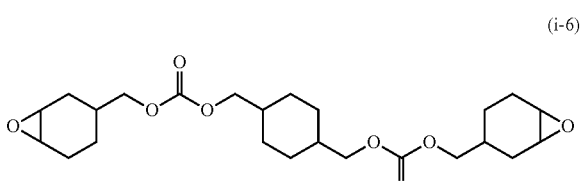

(i-6)

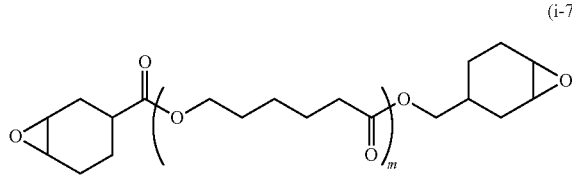

(i-7)

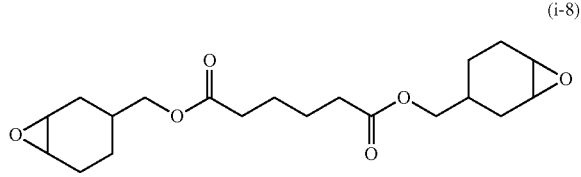

(i-8)

[Chem. 25]

(i-9)

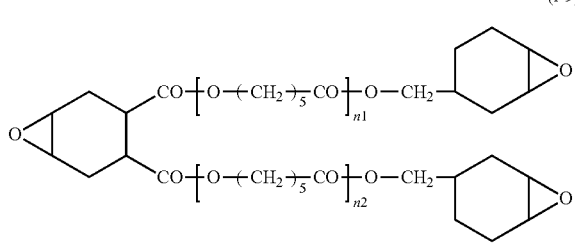

-continued (i-10)

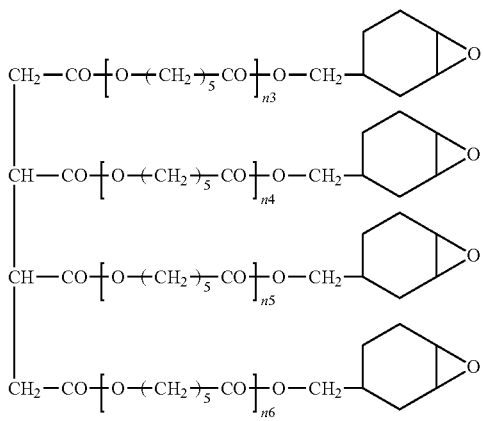

Examples of the compound (2) described above in which an epoxy group is directly bonded to an alicyclic ring with a single bond include a compound represented by Formula (ii) below.

[Chem. 26]

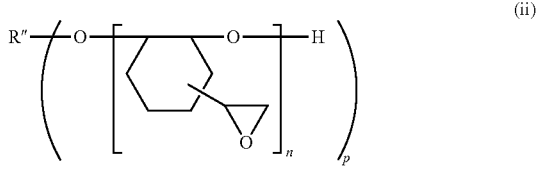

(ii)

In Formula (ii), R″ is a group resulting from elimination of p hydroxyl groups (—OH) from a structural formula of a p-valent alcohol (p-valent organic group), wherein p and n each represent a natural number. Examples of the p-hydric alcohol [R″(OH)$_p$] include polyhydric alcohols (alcohols having from 1 to 15 carbons), such as 2,2-bis(hydroxymethyl)-1-butanol. Here, p is preferably from 1 to 6, and n is preferably from 1 to 30. When p is 2 or greater, n in each group in parentheses (in the outer parentheses) may be the same or different. Examples of the compound represented by Formula (ii) specifically include 1,2-epoxy-4-(2-oxiranyl) cyclohexane adduct of 2,2-bis(hydroxymethyl)-1-butanol (for example, such as the trade name "EHPE3150" (available from Daicel Corporation)).

Examples of the compound (3) described above including an alicyclic ring and a glycidyl ether group in the molecule include glycidyl ethers of alicyclic alcohols (in particular, alicyclic polyhydric alcohols). More particularly, examples thereof include a compound obtained by hydrogenating a bisphenol A type epoxy compound (a hydrogenated bisphenol A type epoxy compound), such as 2,2-bis[4-(2,3-epoxypropoxy)cyclohexyl]propane and 2,2-bis[3,5-dimethyl-4-(2,3-epoxypropoxy)cyclohexyl]propane; a compound obtained by hydrogenating a bisphenol F type epoxy compound (a hydrogenated bisphenol F type epoxy compound), such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; a hydrogenated bisphenol type epoxy compound; a hydrogenated phenol novolac type epoxy compound; a hydrogenated cresol novolac type epoxy compound; a hydrogenated cresol novolac type epoxy compound of bisphenol A; a hydrogenated naphthalene type epoxy compound; a hydrogenated epoxy compound of an epoxy compound obtained from trisphenolmethane; and a hydrogenated epoxy compound of an aromatic epoxy compound described below.

Examples of the aromatic epoxy compound include an epibis type glycidyl ether type epoxy resin obtained by a condensation reaction of bisphenols (for example, such as bisphenol A, bisphenol F, bisphenol S, and fluorenebisphenol) and an epihalohydrin; a high molecular weight epibis type glycidyl ether type epoxy resin obtained by further subjecting the above epibis type glycidyl ether type epoxy resin to an addition reaction with the bisphenol described above; a novolac alkyl type glycidyl ether type epoxy resin obtained by subjecting a phenol (for example, such as phenol, cresol, xylenol, resorcin, catechol, bisphenol A, bisphenol F, and bisphenol S) and an aldehyde (for example, such as formaldehyde, acetaldehyde, benzaldehyde, hydroxybenzaldehyde, and salicylaldehyde) to a condensation reaction to obtain a polyhydric alcohol, and then further subjecting the polyhydric alcohol to condensation reaction with epihalohydrin; and an epoxy compound in which two phenol skeletons are bonded at the 9-position of the fluorene ring, and glycidyl groups are each bonded directly or via an alkyleneoxy group to an oxygen atom resulting from eliminating a hydrogen atom from a hydroxy group of these phenol skeletons.

Examples of the aliphatic epoxy compound include glycidyl ethers of a q-valent alcohol, the alcohol including no cyclic structure (q is a natural number); glycidyl esters of monovalent or polyvalent carboxylic acids (for example, such as acetic acid, propionic acid, butyric acid, stearic acid, adipic acid, sebacic acid, maleic acid, and itaconic acid); epoxidized materials of fats and oils including a double bond, such as epoxidized linseed oil, epoxidized soybean oil, and epoxidized castor oil; and epoxidized materials of polyolefins (including polyalkadienes), such as epoxidized polybutadiene. Here, examples of the q-valent alcohol including no cyclic structure include monohydric alcohols, such as methanol, ethanol, 1-propyl alcohol, isopropyl alcohol, and 1-butanol; dihydric alcohols, such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, and polypropylene glycol; and trihydric or higher polyhydric alcohols, such as glycerin, diglycerin, erythritol, trimethylolethane, trimethylolpropane, pentaerythritol, dipentaerythritol, and sorbitol. In addition, the q-hydric alcohol may be a polyether polyol, a polyester polyol, a polycarbonate polyol, a polyolefin polyol, or the like.

The oxetane compound includes well known or commonly used compounds including one or more oxetane rings in the molecule and is not particularly limited. Examples thereof include 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl}ether, 4,4'-bis[(3-ethyl-3-oxetanyl) methoxymethyl]bicyclohexyl, 1,4-bis[(3-ethyl-3-oxetanyl) methoxymethyl]cyclohexane, 1,4-bis{[(3-ethyl-3-oxetanyl) methoxy]methyl}benzene, 3-ethyl-3-{[(3-ethyloxetane-3-yl)methoxy]methyl}oxetane, xylylenebisoxetane, 3-ethyl-3-

{[3-(triethoxysilyl)propoxy]methyl}oxetane, oxetanylsilsesquioxane, and phenol novolac oxetane.

The vinyl ether compound is not particularly limited, and a well known or commonly used compound including one or more vinyl ether groups in the molecule can be used. Examples thereof include 2-hydroxyethyl vinyl ether (ethyleneglycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ether, oligoethylene glycol divinyl ether, polyethylene glycol monovinyl ether, polyethylene glycol divinyl ether, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropyleneglycol monovinyl ether, oligopropyleneglycol divinyl ether, polypropyleneglycol monovinyl ether, polypropyleneglycol divinyl ether, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol A divinyl ether, bisphenol F divinyl ether, hydroxyoxanorbornanemethanol divinyl ether, 1,4-cyclohexanediol divinyl ether, pentaerythritol trivinyl ether, pentaerythritol tetravinyl ether, dipentaerythritol pentavinyl ether, and dipentaerythritol hexavinyl ether.

In the curable composition (hard coating agent) according to an embodiment of the present invention, a vinyl ether compound is preferably used as another cationically curable compound in combination with the polyorganosilsesquioxane according to an embodiment of the present invention. Through this, the surface hardness of the resulting cured product (hard coating layer) tends to be further increased. In particular, when the curable composition (hard coating agent) according to an embodiment of the present invention is cured by irradiation with active energy rays (in particular ultraviolet rays), a cured product (hard coating layer) with a very high surface hardness can be formed advantageously with good productivity even when the irradiation dose of the active energy rays is reduced. As a result, the production line speed of the plastic lens according to an embodiment of the present invention having the cured product (hard coating layer) can be increased, and the productivity thereof is further improved.

Furthermore, when a vinyl ether compound having one or more hydroxyl groups per molecule is used in particular as another cationically curable compound, a cured product (hard coating layer) having higher surface hardness and superior thermal yellowing resistance (a property in which yellowing due to heating is less likely to occur) can be advantageously formed. As a result, the plastic lens according to an embodiment of the present invention having the cured product (hard coating layer) with the higher quality and the higher durability is obtained. The number of hydroxyl groups per molecule of the vinyl ether compound having one or more hydroxyl groups per molecule is not particularly limited, but is preferably from 1 to 4, and is more preferably 1 or 2. More specifically, examples of vinyl ether compounds having one or more hydroxyl group per molecule include 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,8-octanediol divinyl ether, 1,4-cyclohexane dimethanol monovinyl ether, 1,3-cyclohexane dimethanol monovinyl ether, 1,2-cyclohexane dimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ether, polyethylene glycol monovinyl ether, tripropylene glycol monovinyl ether, tetrapropylene glycol monovinyl ether, pentapropylene glycol monovinyl ether, oligopropylene glycol monovinyl ether, polypropylene glycol monovinyl ether, pentaerythritol trivinyl ether, and dipentaerythritol pentavinyl ether.

The content (blended amount) of the additional cationically curable compound in the curable composition (hard coating agent) is not particularly limited but is preferably 50 wt. % or less (for example, from 0 to 50 wt. %), more preferably 30 wt. % or less (for example, from 0 to 30 wt. %), and even more preferably 10 wt. % or less, relative to a total amount of the polyorganosilsesquioxane according to an embodiment of the present invention and the additional cationically curable compound (100 wt. %; a total amount of cationically curable compounds). The additional cationically curable compound contained in an amount of 50 wt. % or less (in particular, 10 wt. % or less) tends to improve the scratch resistance of the cured product (hard coating layer). On the other hand, the additional cationically curable compound contained in an amount of 10 wt. % or greater can possibly impart a desired performance to the curable composition (hard coating agent) and the cured product (hard coating layer) (for example, fast curing properties and viscosity adjustment to the curable composition).

The content (blended amount) of the vinyl ether compound (in particular, the vinyl ether compound having one or more hydroxyl groups in the molecule) in the curable composition (hard coating agent) according to an embodiment of the present invention is not particularly limited, but is preferably from 0.01 to 10 wt. %, more preferably from 0.05 to 9 wt. %, even more preferably from 1 to 8 wt. %, relative to the total amount of the polyorganosilsesquioxane according to an embodiment of the present invention and the additional cationically curable compounds (100 wt. %; the total amount of cationically curable compounds). When the content of the vinyl ether compound is controlled to the range described above, the surface hardness of the cured product (hard coating layer) is further increased, and the cured product (hard coating layer) with the very high surface hardness tends to be obtained even if the irradiation dose of the active energy rays (for example, ultraviolet rays) is reduced. In particular, when the content amount of the vinyl ether compound having one or more hydroxyl groups per molecule is controlled to the aforementioned range, in addition to the surface hardness of the cured product (hard coating layer) being particularly high, the thermal yellowing resistance thereof tends to further improve.

The curable composition (hard coating agent) according to an embodiment of the present invention may contain a leveling agent to improve the surface smoothness. It is sufficient that the leveling agent has an ability to reduce surface tension, and commonly used leveling agents may be used. From the viewpoint of good ability to reduce surface tension, silicone-based leveling agents and fluorine-based leveling agents are preferably used as the leveling agent, and the fluorine-based leveling agent is particularly preferable. In an embodiment of the present invention, combination of the polyorganosilsesquioxane according to an embodiment of the present invention and the leveling agent can improve the surface smoothness, as well as the transparency, glossiness (appearance), and slipperiness. Furthermore, the surface hardness and the scratch resistance can be further improved by using a specific leveling agent in a specific amount.

The silicone leveling agent is a leveling agent containing a compound having a polyorganosiloxane backbone. Any polyorganosiloxane backbone may be used so long as it is a polyorganosiloxane formed from an M unit, D unit, T unit, or Q unit as in the polyorganosilsesquioxane according to an embodiment of the present invention. Typically, polyorganosiloxane formed from the D unit is preferably used. Typical organic groups used in the polyorganosiloxane include a $C_{1-4}$ alkyl group and aryl group, and a methyl group, a phenyl group (in particular a methyl group) are commonly used. The number of repetitions of the siloxane units (a degree of polymerization) is, for example, from 2 to 3000, preferably from 3 to 2000, more preferably from 5 to 1000.

The fluorine-based leveling agent is a leveling agent having a fluoroaliphatic hydrocarbon backbone, and examples of the fluoroaliphatic hydrocarbon backbone include fluoro $C_{1-10}$ alkanes such as fluoromethane, fluoroethane, fluoropropane, fluoroisopropane, fluorobutane, fluoroisobutane, fluoro t-butane, fluoropentane, and fluorohexane.

Any fluoroaliphatic hydrocarbon backbone may be used so long as at least some of the hydrogen atoms in the fluoroaliphatic hydrocarbon backbone are substituted by fluorine atoms, but perfluoroaliphatic hydrocarbon backbones in which all of the hydrogen atoms have been substituted by the fluorine atoms are preferable, from the viewpoints of improving the scratch resistance, sliding properties, and anti-smudge properties.

Furthermore, the fluoroaliphatic hydrocarbon backbone may form a polyfluoroalkylene ether backbone, repeating units via an ether bond. The fluoroaliphatic hydrocarbon group as the repeating unit may be at least one group selected from the group consisting of fluoro $C_{1-4}$ alkylene groups such as fluoromethylene, fluoroethylene, fluoropropylene, and fluoroisopropylene. The number of repetitions of the polyfluoroalkylene ether units (degree of polymerization) is, for example, from 10 to 3000, preferably from 30 to 1000, more preferably from 50 to 500.

Of these backbones, a polyorganosiloxane backbone is preferred which has the excellent affinity with the polyorganosilsesquioxane according to an embodiment of the present invention.

The leveling agent having such a skeleton may have functional groups such as hydrolyzable condensable groups, reactive groups for epoxy groups, radical polymerizable groups, polyether groups, polyester groups, and polyurethane groups, to impart various functionalities. Furthermore, the silicone-based leveling agent may have a fluoroaliphatic hydrocarbon group, or the fluorine-based leveling agent may have a polyorganosiloxane group.

Examples of the hydrolyzable condensable group include a hydroxysilyl group, trihalosilyl groups such as a trichlorosilyl group, dihalo-$C_{1-4}$ alkylsilyl groups such as a dichloromethylsilyl group, diharoaryl groups such as a dichlorophenylsilyl group, halodi-$C_{1-4}$ alkylsilyl groups such as chlorodi-$C_{1-4}$ alkylsilyl groups including a chlorodimethylsilyl group, tri-$C_{1-4}$ alkoxysilyl groups such as a trimethoxysilyl group and a triethoxysilyl group, di-$C_{1-4}$ alkoxy-$C_{1-4}$ alkylsilyl groups such as a dimethoxymethylsilyl group, and diethoxymethylsilyl group, di-$C_{1-4}$ alkoxyarylsilyl group such as dimethoxyphenylsilyl group and diethoxyphenylsilyl group, $C_{1-4}$ alkoxydi-$C_{1-4}$ alkylsilyl groups such as a methoxydimethylsilyl group, and an ethoxydimethylsilyl group, $C_{1-4}$ alkoxydiarylsilyl groups such as a methoxydiphenylsilyl group and an ethoxdiphenylsilyl group, $C_{1-4}$ alkoxy-$C_{1-4}$ alkylarylsilyl groups such as a methoxymethylphenylsilyl group, and an ethoxymethylphenylsilyl group. Among these, from the viewpoint of the reactivity, the tri-$C_{1-4}$ alkoxysilyl groups such as trimethoxysilyl group are preferable.

Examples of the reactive group for the epoxy group include a hydroxyl group, an amino group, a carboxyl group, acid anhydride groups (such as maleic anhydride group), and isocyanate groups. Among these, from the viewpoint of the reactivity, the hydroxyl group, amino group, acid anhydride groups, and isocyanate groups are widely used, and the hydroxyl group is preferably used from the viewpoint of the handling, and ease of availability.

Examples of the radical polymerizable groups include (meth)acryloyloxy groups, and vinyl groups. Of these, the (meth)acryloyloxy groups are widely used.

Examples of the polyether group include polyoxy $C_{2-4}$ alkylene groups such as polyoxyethylene groups, polyoxypropylene groups, polyoxybutylene, and polyoxyethylene-polyoxypropylene groups. In the polyether group, the number of repetitions of the oxyalkylene group (addition mole number) is, for example, from 2 to 1000, preferably from 3 to 100, more preferably from 5 to 50. Among these, the polyoxy $C_{2-3}$ alkylene groups such as polyoxyethylene and polyoxypropylene are preferable, and particularly the polyoxyethylene group is preferable.

Examples of the polyester group include polyester groups formed by a reaction of a dicarboxylic acid (for example, an aromatic carboxylic acid such as terephthalic acid or an aliphatic carboxylic acid such as adipic acid) with a diol (for example, an aliphatic diol such as ethylene glycol); polyester groups formed by a ring-opening polymerization of a cyclic ester (e.g., lactones such as caprolactone), and the like.

Examples of the polyurethane group include commonly used polyester-type polyurethane groups, and polyether-type polyurethane groups.

These functional groups may be introduced directly to the polyorganosiloxane backbone or to the fluoroaliphatic hydrocarbon backbone, or may be introduced via a linking group such as an alkylene group, a cycloalkylene group, an ether group, an ester group, an amide group, an urethane group, or combinations thereof.

Among these functional groups, from the viewpoint of enhancing the hardness of the cured product (hard coating layer) by reacting with the polyorganosilsesquioxane according to an embodiment of the present invention, the reactive group with the hydrolyzable condensable group or the epoxy group is preferable, and the reactive group with the epoxy group (particularly hydroxyl group) is particularly preferable.

Note that the hydroxyl group may be a terminal hydroxyl group in the (poly)oxyalkylene group (such as a (poly) oxyethylene group). Examples of such a leveling agent include a silicone leveling agent in which a (poly)oxy-$C_{2-3}$ alkylene group such as a (poly)oxyethylene group is introduced to a side chain of a polyorganosiloxane backbone such as polydimethylsiloxane (such as polydimethylsiloxane-polyoxyethylene); and a fluorine-based leveling agent in which a fluoroaliphatic hydrocarbon group is introduced into a side chain of a (poly)oxy-$C_{2-3}$ alkylene backbone such as (poly) oxyethylene (such as fluoroalkylpolyoxyethylene).

Commercially available silicone-based leveling agents can be used as the silicone-based leveling agent. For example, products may be used which are commercially available under the trade names "BYK-300", "BYK-301/302", "BYK-306", "BYK-307", "BYK-310", "BYK-315", "BYK-313", "BYK-320", "BYK-322", "BYK-323", "BYK-325", "BYK-330", "BYK-331", "BYK-333", "BYK-337", "BYK-341", "BYK-344", "BYK-345/346", "BYK-347", "BYK-348", "BYK-349", "BYK-370", "BYK-375", "BYK-377", "BYK-378", "BYK-UV3500", "BYK-UV3510", "BYK-UV3570", "BYK-3550", "BYK-SILCLEAN3700", and "BYK-SILCLEAN3720" (all above available from BYK Japan KK); the trade names "AC FS 180", "AC FS 360", and "AC S 20" (all above available from Algin Chemie); the trade names "POLYFLOW KL-400X", "POLYFLOW KL-400HF", "POLYFLOW KL-401", "POLYFLOW KL-402", "POLYFLOW KL-403", and "POLYFLOW KL-404" (all above available from Kyoeisha Chemical Co., Ltd.); the trade names "KP-323", "KP-326", "KP-341", "KP-104", "KP-110", and "KP-112" (all above available from Shin-Etsu Chemical Co., Ltd.); and trade name "LP-7001", "LP-7002", "8032 ADDITIVE", "57 ADDITIVE", "L-7604", "FZ-2110", "FZ-2105", "67 ADDITIVE", "8618 ADDITIVE", "3 ADDITIVE", and "56 ADDITIVE" (all above available from Dow Corning Toray Co., Ltd.).

Commercially available fluorine-based leveling agents may be used as the fluorine-based leveling agent. For example, products may be used which are commercially available under the trade names "Optool DSX" and "Optool DAC-HP" (all above available from Daikin Industries, Ltd.); the trade names "SURFLON S-242", "SURFLON S-243", "SURFLON S-420", "SURFLON 5-611", "SURFLON S-651", and "SURFLON S-386" (all above available from AGC Seimi Chemical Co., Ltd.); trade name "BYK-340" (available from BYK Japan KK); the trade names "AC 110a" and "AC 100a" (all above available from Algin Chemie); the trade names "MEGAFAC F-114", "MEGAFAC F-410", "MEGAFAC F-444", "MEGAFAC EXP TP-2066", "MEGAFAC F-430", "MEGAFAC F-472SF", "MEGAFAC F-477", "MEGAFAC F-552", "MEGAFAC F-553", "MEGAFAC F-554", "MEGAFAC F-555", "MEGAFAC R-94", "MEGAFAC RS-72-K", "MEGAFAC RS-75", "MEGAFAC F-556", "MEGAFAC EXP TF-1367", "MEGAFAC EXP TF-1437", "MEGAFAC F-558", and "MEGAFAC EXP TF-1537" (all above available from DIC Corporation); the trade names "FC-4430" and "FC-4432" (all above available from Sumitomo 3M Ltd.); the trade names "FTERGENT 100", "FTERGENT 100C", "FTERGENT 110", "FTERGENT 150", "FTERGENT 150CH", "FTERGENT A-K", "FTERGENT 501", "FTERGENT 250", "FTERGENT 251", "FTERGENT 222F", "FTERGENT 208G", "FTERGENT 300", "FTERGENT 310", and "FTERGENT 400SW" (all above available from NEOS Corporation); and the trade names "PF-136A", "PF-156A", "PF-151N", "PF-636", "PF-6320", "PF-656", "PF-6520", "PF-651", "PF-652", and "PF-3320" (all above available from Kitamura Chemicals Co., Ltd.) can be used.

One type of these leveling agents may be used alone, or two or more types of these leveling agents may be used in combination. Among these leveling agents, the silicone-based leveling agent having a hydroxyl group is preferable from the viewpoint of excellent affinity with the polyorganosilsesquioxane according to an embodiment of the present invention and ability to react with the epoxy group, thereby improving the hardness and appearance of the cured product (hard coating layer).

Examples of the silicone-based leveling agent including a hydroxyl group include polyether modified polyorganosiloxanes obtained by introducing a polyether group into the main chain or the side chain of the polyorganosiloxane backbone (such as polydimethylsiloxanes); polyester modified polyorganosiloxanes obtained by introducing a polyester group into the main chain or the side chain of the polyorganosiloxane backbone; and silicone-modified (meth) acrylic-based resins obtained by introducing a polyorganosiloxane into a (meth)acrylic-based resin. In these leveling agents, the hydroxyl group may include a polyorganosiloxane backbone or may include a polyether group, a polyester group or a (meth)acryloyl group. As the commercially available leveling agent, for example, products commercially available under the trade names "BYK-370", "BYK-SILCLEAN 3700", and "BYK-SILCLEAN 3720" (all above available from BYK Japan KK), may be used.

A proportion of the leveling agent is, for example, from 0.01 to 20 parts by weight, preferably from 0.05 to 15 parts by weight, more preferably from 0.1 to 10 parts by weight, and even more preferably from 0.13 to 5 parts by weight, per 100 parts by weight of the polyorganosilsesquioxane according to an embodiment of the present invention. When the proportion of the leveling agent is too small, the surface smoothness of the cured product (hard coating layer) may possibly be impaired, and when it is too large, the surface hardness of the cured product (hard coating layer) may possibly be reduced.

In particular, a proportion of the silicone-based leveling agent is, for example, from 0.01 to 10 parts by weight, preferably from 0.03 to 5 parts by weight, more preferably from 0.05 to 3 parts by weight, even more preferably from 0.07 to 2 parts by weight, particularly preferably 0.1 to 1.5 parts by weight, per 100 parts by weight of the polyorganosilsesquioxane according to an embodiment of the present invention. In addition, a proportion of the silicone-based leveling agent having the hydroxyl group is, for example, from 0.01 to 5 parts by weight, preferably from 0.03 to 4 parts by weight, more preferably from 0.05 to 3 parts by weight, even more preferably from 0.07 to 2 parts by weight, particularly preferably from 0.1 to 1.5 parts by weight, per 100 parts by weight of the polyorganosilsesquioxane according to an embodiment of the present invention.

In particular, a proportion of the fluorine-based leveling agent is, for example, from 0.01 to 5 parts by weight, preferably from 0.03 to 3 parts by weight, more preferably from 0.05 to 2 parts by weight, even more preferably from 0.07 to 1 parts by weight, particularly preferably from 0.1 to 0.8 parts by weight, per 100 parts by weight of the polyorganosilsesquioxane according to an embodiment of the present invention. When the proportion of the leveling agent is adjusted to these ranges, not only the surface smoothness of the cured product (hard coating layer) can be improved but also the surface hardness of the cured product (hard coating layer), which has not been assumed to be a function of the leveling agent, can be improved.

The curable composition (hard coating agent) according to an embodiment of the present invention may further include commonly used additives as additional optional components (hereinafter referred to as "other components), for example, inorganic fillers such as precipitated silica, wet silica, fumed silica, calcined silica, titanium oxide, zirconium oxide, alumina, glass, quartz, aluminosilicic acid, metal oxides including iron oxide and zinc oxide, calcium carbonate, carbon black, silicon carbide, silicon nitride, and boron nitride, inorganic particles, inorganic fillers obtained by treating the above filler with an organosilicon compound such as an organohalosilane, organoalkoxysilane, or organosilazane; organic resin fine powders such as a silicone resin, an epoxy resin, and a fluororesin; fillers such as a conductive metal powder, for example, silver, or copper, curing auxiliaries, solvents (such as an organic solvent), stabilizers (such as an antioxidant, an ultraviolet absorber, a light-resistant stabilizer, a heat stabilizer, and a heavy metal inactivator), flame retardants (such as a phosphorus-based flame retardant, a halogen-based flame retardant, and an inorganic flame retardant), flame retardant auxiliaries, reinforcing materials (such as an additional filler), nucleating agents, coupling agents (such as a silane coupling agent), lubricants, waxes, plasticizers, releasing agents, an impact resistance modifier, hue modifiers, transparentizing agents, rheology modifiers (such as a fluidity modifier), processability modifiers, colorants (such as a dye and a pigment), antistatic agents, dispersants, surface conditioners (such as an antifoaming agent, and a welling-up prevention agent), surface modifiers (such as a slipping agent), matting agents, antifoaming agents, foam inhibitors, deforming agents, antibacterial agents, preservatives, viscosity modifiers, thickening agents, photosensitizers, and foaming agents. One type alone or two or more types of these additives in combination can be used.

The total content (blended amount) of the other components in the curable composition (hard coating agent) according to an embodiment of the present invention is not particularly limited, but is preferably 10 wt. % or less, more preferably 5 wt. % or less, even more preferably 4 wt. % or less, even more preferably 3 wt. % or less, even more preferably 2 wt. % or less, particularly preferably 1 wt. % or less, relative to the total solid content (100 wt. %) of the curable composition excluding the volatile components such as a solvent. When the content of the other components exceeds 10 wt. %, the surface hardness, adhesion, light resistance (UV resistance), mechanical properties (bending properties, and the like), fluidity, and the like of the cured product (hard coating layer) may be impaired, and when the plastic lens according to an embodiment of the present invention is left in a high temperature environment or mechanical stress is applied to the plastic lens, cracks tend to be generated on the vapor deposition coated film, and then the hard coating layer.

The curable composition (hard coating agent) according to an embodiment of the present invention can be prepared by, but not particularly limited to, agitating and mixing each component described above at room temperature or under heating as necessary. Here, the curable composition (hard coating agent) according to an embodiment of the present invention can be used as a one-part composition, which contains each component mixed beforehand and is used as is, or alternatively, used as a multi-part (for example, two-part) composition of which two or more components are separately stored and then mixed at a predetermined ratio before use.

The curable composition (hard coating agent) according to an embodiment of the present invention is not particularly limited, but is preferably a liquid at normal temperature (about 25° C.). More specifically, the curable composition (hard coating agent) according to an embodiment of the present invention diluted with a solvent to 20% [in particular, a curable composition (solution) having a ratio of methyl isobutyl ketone of 20 wt. %] has a viscosity at 25° C. of preferably from 300 to 20000 mPa·s, more preferably from 500 to 10000 mPa·s, and even more preferably from 1000 to 8000 mPa·s. The curable composition (hard coating layer) with the viscosity of 300 mPa·s or greater tends to further improve the hardness of the cured product. On the other hand, the curable composition (hard coating agent) with the viscosity of 20000 mPa·s or less facilitates the preparation and handling of the curable composition, and tends to less likely to leave residual bubbles in the cured product (hard coating layer). Here, the viscosity of the curable composition (hard coating agent) according to an embodiment of the present invention is measured using a viscometer (trade name "MCR301", available from Anton Paar GmbH) under conditions of a swing angle of 5%, a frequency from 0.1 to 100 (1/s), and a temperature of 25° C.

Plastic Lens Substrate

As a plastic material for a plastic lens substrate used in the plastic lens according to an embodiment of the present invention, plastic materials commonly used in the field of lenses may be used without particular limitation, and examples thereof include polyamide-based resins, polycarbonate-based resins, acrylic resins, allyl resins (diethylene glycol bisallyl carbonate homopolymers or copolymers), urethane-based resins, thiourethane-based resins, and other resins (sulfide-based resins, polyester-based resins). In particular, the polyamide-based resins are preferable, from the viewpoints that they are excellent in the light weight, crystallinity, chemical resistance (for example, resistance against alcohol, resistance against DEP (diethyl phthalate)), resistance against drilling (resistance against break), optical properties (low chromatic aberration, high Abbe numbers, and the like), and superior in the heat resistance and durability in which even if the plastic lens according to an embodiment of the present invention is left in a high temperature environment, or subject to mechanical stress, cracks are not easily generated in the vapor deposition coated film and the hard coating layer. These additives may be used alone or in combination of two or more types.

Examples of the polyamide-based resin include aliphatic polyamide-based resins (aliphatic polyamide), alicyclic polyamide-based resins (alicyclic polyamide), and aromatic polyamide-based resins (aromatic polyamide). The polyamide-based resin may be a homopolyamide or a copolyamide.

Examples of the aliphatic polyamides include homopolyamides, for example, condensation products of an aliphatic diamine component (such as a $C_{4-14}$ alkylene diamine including tetramethylene diamine, hexamethylene diamine, or dodecanediamine) and an aliphatic dicarboxylic acid component (such as $C_{6-14}$ alkanedicarboxylic acid including adipic acid, sebacic acid, or dodecanedioic acid) (e.g., polyamide 46, polyamide 66, polyamide 610, polyamide 612, polyamide 1010), homopolyamides of a lactam (such as lactam having about 4 to 16 carbons including ε-caprolactam or ω-laurolactam) or an aminocarboxylic acid (such as an aminocarboxylic acid having about 4 to 16 carbons including ε-aminoundecanoic acid) (e.g., polyamide 6, polyamide 11, polyamide 12); copolyamides, for example, copolyamides obtained by copolymerization of a monomer component capable of forming a polyamide such as the aliphatic diamine component, aliphatic dicarboxylic acid component, lactam, or aminocarboxylic acid, copolymers of 6-aminocaproic acid and 12-aminododecanoic acid; copolymers of 6-aminocaproic acid, 12-aminododecanoic acid, hexamethylene diamine, and adipic acid; polyamide 6/11, polyamide 6/12, polyamide 66/11, and polyamide 66/12.

Examples of the alicyclic polyamides include homo- or copolyamides having at least one type selected from alicyclic diamines and alicyclic dicarboxylic acids as the constituting component. Examples of the alicyclic diamine include diamino $C_{5-10}$ cycloalkanes such as diaminocyclohexane; bis(amino $C_{5-10}$ cycloalkyl)$C_{1-6}$ alkanes such as bis(4-aminocyclohexyl)methane, bis(4-amino-3-methylcyclohexyl)methane, and 2,2-bis(4'-aminocyclohexyl)propane. The alicyclic diamine may include substituents, for example, a $C_{1-6}$ alkyl group such as a methyl group and an ethyl group, preferably a $C_{1-4}$ alkyl group, more preferably a $C_{1-2}$ alkyl group. In addition, examples of the alicyclic dicarboxylic acid include $C_{5-10}$ cycloalkane-dicarboxylic acids such as cyclohexane-1,4-dicarboxylic acid and cyclohexane-1,3-dicarboxylic acid.

The alicyclic polyamide may be a resin having, as the diamine component and the dicarboxylic acid component, an aliphatic diamine (a $C_{4-14}$ alkylene diamine such as tetramethylene diamine, hexamethylene diamine, and dodecanediamine) and/or an aliphatic dicarboxylic acid (a $C_{4-18}$ alkanedicarboxylic acids such as adipic acid, sebacic acid, and dodecanedioic acid), in addition to the alicyclic diamines and/or alicyclic dicarboxylic acids.

Preferred alicyclic polyamides include, for example, resins (homo- or copolyamides) having, as the constituting components, an alicyclic diamine [for example, bis (amino $C_{5-10}$ cycloalkyl)$C_{1-6}$ alkanes, preferably bis(amino $C_{6-8}$ cycloalkyl)$C_{1-6}$ alkanes, more preferably bis(aminocyclohexyl)$C_{1-3}$ alkanes], and an aliphatic dicarboxylic acid (for example, $C_{4-18}$ alkanedicarboxylic acids, preferably $C_{6-16}$ alkanedicarboxylic acids, even more preferably $C_{8-14}$ alkanedicarboxylic acids). Typical alicyclic polyamide-based resins (the alicyclic polyamide-based resins containing the alicyclic diamine and the aliphatic dicarboxylic acid as the constituting components) include alicyclic polyamide resins represented by Formula (7) below.

[Chem. 27]

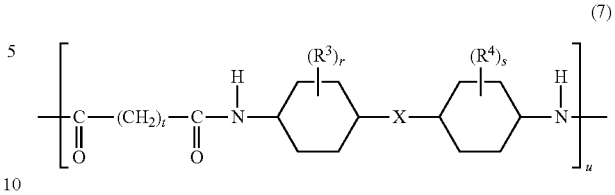

where X represents a direct bond, an alkylene group, or an alkenylene group; $R^3$ and $R^4$ represent the same or different alkyl groups; r and s represent integers of 0 or 1 to 4, t and u represent integers greater than or equal to 1.

In Formula (7), the alkylene group represented by the group X (or an alkylidene group) is exemplified by $C_{1-6}$ alkylene groups (or alkylidene groups) such as methylene, ethylene, ethylidene, propylene, propane-1,3-diyl, 2-propylidene, and butylene, preferably $C_{1-4}$ alkylene groups (or alkylidene groups), more preferably $C_{1-3}$ alkylene groups (or alkylidene groups). Furthermore, examples of the alkenylene group represented by the group X include $C_{2-6}$ alkenylene groups such as vinylene and propylene, preferably $C_{2-4}$ alkenylene groups.

In the substituents $R^3$ and $R^4$, the alkyl groups include, for example, $C_{1-6}$ alkyl groups such as methyl, ethyl, propyl, isopropyl, and butyl groups, preferably $C_{1-4}$ alkyl groups, more preferably $C_{1-2}$ alkyl groups (methyl groups, ethyl groups, and the like).

The numbers of these substituents $R^3$ and $R^4$, r and s, can be selected from integers of 0 and from 1 to 4, but may usually be an integer of 0 or from 1 to 3, preferably an integer of 0 or from 1 to 2, more preferably 0 or 1. The substituted positions of the substituents $R^3$ and $R^4$ may also be selected from the 2-, 3-, 5-, 6-position relative to the amido group, preferably the 2-, or 6-position.

In Formula (7), t may be, for example, 4 or greater (for example, about from 4 to 30), preferably 6 or greater (for example, about from 6 to 20), more preferably 8 or greater (for example, about from 8 to 15). Furthermore, in Formula (7), u (a degree of polymerization) may be, for example, 5 or greater (for example, about from 10 to 1000), preferably 10 or greater (for example, about from 30 to 800), more preferably 50 or greater (for example, about from 100 to 500).

Such alicyclic polyamides are highly transparent and are known as so-called transparent polyamides. The alicyclic polyamide-based resins as described above are available, for example, from Daicel-Evonik Ltd. as "TROGAMID", or from EMS Ltd. as "grille amide (Grilamid)". The alicyclic polyamide-based resins may be used alone or in combination of two or more types.

Examples of the aromatic polyamides include polyamides in which at least one component of the diamine component (for example, an aliphatic diamine such as a $C_{4-14}$ alkylenediamine including tetramethylene diamine, hexamethylene diamine, and dodecandiamine) and the dicarboxylic acid component (for example, an aliphatic dicarboxylic acid such as a $C_{4-14}$ alkane dicarboxylic acid including adipic acid, sebacic acid, and dodecanedioic acid) is an aromatic component, for example, polyamides in which the diamine component is an aromatic component [a condensate of an aromatic diamine such as MXD-6 (metaxylylene diamine, or the like) and an aliphatic dicarboxylic acid], and polyamides in which the dicarboxylic acid component is an aromatic component [a condensate of an aliphatic diamine (trimethylhexamethylenediamine, or the like) and an aromatic dicarboxylic acid (terephthalic acid, isophthalic acid, or the like)].

As the polyamide-based resin, a homopolyamide or copolyamide including a dimer acid as a dicarboxylic acid component, a polyamide into which a branched chain structure is introduced using a small amount of a polyfunctional polyamine and/or a polycarboxylic acid component, or a modified polyamide (N-alkoxymethyl polyamide) may be used. Furthermore, in some applications, the polyamide-based resin may be a thermoplastic elastomer.

These polyamide-based resins may be used alone or in combination of two or more types.

Of the various polyamides exemplified above, the polyamide-based resins that are preferably suitable for the plastic lens substrate according to an embodiment of the present invention is exemplified by the alicyclic polyamide-based resins.

The number average molecular weight of the polyamide-based resin may be, for example, about from 6000 to 300000, preferably about from 10000 to 200000, even more preferably about from 20000 to 200000.

The polyamide-based resin may be non-crystalline or may have crystallinity, so long as the transparency is ensured. In particular, the polyamide-based resin may be a polyamide-based resin having microcrystallinity (e.g., the degree of crystallinity of about from 1 to 20%, preferably about from 1 to 10%, more preferably about from 1 to 8%) (e.g., the alicyclic polyamide-based resin such as alicyclic polyamide resins represented by Formula (1) above). The degree of crystallinity can be determined by a commonly used thermal analysis (a differential scanning calorimetry). A heat of fusion can be determined from an endothermic peak area (S) of the polyamide-based resin, from which the degree of crystallinity can be determined. The heat of fusion may be, for example, 30 J/g or less (for example, about 1 to 30 J/g), preferably 20 J/g or less (for example, about from 2 to 20 J/g), more preferably 17 J/g or less (about from 3 to 17 J/g).

The polyamide-based resin may have a heat melting temperature (or melting point), and the heat melting temperature (Tm) may be, for example, about 100 to 300° C., preferably about 110 to 280° C., even more preferably about 130 to 260° C. In particular, the heat melting temperature (Tm) of the polyamide-based resin having the crystallinity (particularly microcrystallinity) may be, for example, about 150 to 300° C., preferably about 180 to 280° C., even more preferably about 210 to 260° C.

The polyamide-based resin often has a higher Abbe number than those of polycarbonate-based resins. In particular, a protective film for a polarizing film formed from the polyamide-based resin having a high Abbe number can efficiently prevent the generation of rainbow color unevenness. Therefore, the Abbe number of the polyamide-based resin can be selected from a range of 30 or greater (for example, about from 32 to 65), usually 35 or greater (for example, about from 35 to 65), and it may be, for example, 40 or greater (for example, about from 40 to 60), preferably 42 or greater (for example, about from 42 to 58), even more preferably 44 or greater (for example, about from 44 to 55).

The plastic material used in the plastic lens substrate according to an embodiment of the present invention may include various additives such as a stabilizer (a thermal stabilizer, an UV absorber, an antioxidant, and the like), a plasticizer, a lubricant, a filler, a colorant, a flame retardant, an antistatic agent, and the like.

The plastic lens substrate according to an embodiment of the present invention can be manufactured by a known thermoforming technique using the plastic material described above, for example, injection molding, compression molding, transfer molding, injection compression molding, or the like, and the plastic lens substrate can be preferably formed by injection molding, injection compression molding, or the like. The injection molding can be performed by performing the injection molding to a melted resin of the plastic material or composition of the melted resin into a mold. For example, a plastic lens substrate having a curved shape (e.g., spherical shape) may be formed by performing the injection molding to a resin of the plastic material on a convex and/or concave surface, but typically, the resin is often molded onto the concave surface side by the injection molding. Note that injection molding can be performed using a commonly used method, for example, by injecting a thermoplastic resin, which has been melt-kneaded at a temperature of about 200 to 350° C. (preferably 250 to 330° C.), at a pressure about from 50 to 200 MPa, depending on the type of resin. In addition, the molded article, obtained by injection molding, may be annealed. When the injection compression molding method is used, a plastic lens substrate with a high dimensional precision can be obtained because a compressive force can be applied to the resin in the mold after injecting the melted resin into the mold.

The thickness of the plastic lens substrate can be set without limitation in a range employed in typical eyeglass lenses, and is normally about from 1.0 to 3.0 mm. In a case of materials for a corrective lens (called RX), it is about from 6.0 to 13.0 mm. The surface shape of the plastic lens substrate is not particularly limited, and may be any shape such as a flat surface, a convex surface, a concave surface, or the like.

The plastic lens substrate according to an embodiment of the present invention may be a polarizing lens. The form of the polarizing lens is not particularly limited, and may be a single layer polarizing lens or a form in which a plurality of layers are laminated. The polarizing lens preferably has a structure in which a protective film is laminated on at least one surface of a polarizing film, and the protective film is formed from the resin of the plastic material (preferably a polyamide-based resin).

The polarizing film is not particularly limited, and examples thereof include polyvinyl alcohol-based polarizing films. The polyvinyl alcohol-based polarizing film is typically constituted by a polyvinyl alcohol-based resin film and a dichroic substance (iodine, dichroic dye, or the like). The polyvinyl alcohol-based resin may be a saponified product of a copolymer of polyvinyl acetate or vinyl acetate and a small amount of a copolymerizable monomer (an unsaturated carboxylic acid, unsaturated sulfonic acid, cationic monomer, or the like), and a derivative from the saponified compound (a formal compound, an acetal compound, or the like). Specific examples of the polyvinyl alcohol-based resin include polyvinyl alcohol, polyvinyl acetal, and polyvinyl butyral. An average degree of polymerization of the polyvinyl alcohol-based resin may be, for example, about from 1000 to 10000, about from 2000 to 7000, and even more preferably about from 3000 to 5000. Furthermore, a degree of saponification of the polyvinyl alcohol-based resin is about 85 mol % or greater, preferably about 90 mol % or greater (for example, from 90 to 100 mol %), even more preferably about 95 mol % or greater (for example, from 98 to 100 mol %).

The polarizing film can be formed by subjecting the polyvinyl alcohol-based resin film to a treatment such as a swelling treatment, dyeing treatment with a dichroic substance, crosslinking treatment, and stretching treatment (uniaxial stretching treatment with a magnification about from 3 to 7). The thickness of the polarizing film may be, for example, about from 5 to 100 µm (for example, from 10 to 80 µm). The surface of the polarizing film may be subjected to various surface treatments (e.g., a corona discharge treatment, plasma treatment, and anchor coating treatment) to improve the adhesion.

The forming method of the protective film is not particularly limited, and can be usually performed by a melt extrusion method, a solution casting method, or the like, using the plastic material described above (preferably a polyamide-based resin). In the melt extrusion method, for example, the resin of the plastic material may be melted and mixed in an extruder or the like, extruded from a die (for example, a T die), and cooled to produce the protective film. In terms of the productivity of the protective film, the melt-extrusion method is preferable. The resin temperature during melting and forming (melt forming) of the plastic material can typically be selected from a temperature range of about 120 to 350° C.

The thickness of the protective film is not particularly limited and can be selected according to the use, and may be, for example, about from 20 to 1000 µm, preferably about from 30 to 800 µm (for example, from 40 to 600 µm), even more preferably about from 50 to 500 µm (e.g., from 100 to 300

The protective film may be subjected to a stretching process to impart orientation. In addition, the surface of the protective film may be subjected to various surface treatments (e.g., a corona discharge treatment, plasma treatment, and anchor coating treatment), to improve the adhesion.

The protective film in the polarizing lens may usually be laminated to the polarizing film via an adhesive layer. That is, the polarizing lens may constitute the polarizing film and the protective film laminated on at least one surface of the polarizing film with an adhesive layer interposed between the polarizing film and the protective film.

The adhesive (or tacky adhesive) that forms the adhesive layer is not particularly limited, and examples thereof include commonly used adhesives such as an acrylic adhesive, a urethane-based adhesive, and an epoxy-based adhesive. Any adhesive that sufficiently adheres the polarizing film to the protective film for a polarizing film may be used. The adhesive layer may also contain various additives, a stabilizer (a thermal stabilizer, a UV absorber, and an antioxidant), a plasticizer, a colorant, a flame retardant, an antistatic agent, a viscosity modifier, and the like. The thickness of the adhesive layer can be selected from a range, for example, about from 0.1 to 80 µm, and is usually about from 1 to 60 µm, preferably about from 2 to 50 µm, more preferably about from 5 to 40 µm, in terms of a solid content.

The polarizing lens having the adhesive layer can be manufactured by laminating the protective film on one or both sides of the polarizing film using the adhesive. In this method, typically, the protective film is often adhered to both sides of the polarizing film (polarizing film or sheet). After adhering the polarizing film to the protective film with the adhesive, aging may be performed at an appropriate temperature (for example, about 30 to 70° C.).

Note that, to adjust the coating properties, the adhesive may contain an organic solvent, for example, a hydrocarbon (an aliphatic hydrocarbon such as hexane, an alicyclic hydrocarbon such as cyclohexane, an aromatic hydrocarbon such as toluene), a halogenated hydrocarbon, an ester (such as ethyl acetate), a ketone (such as acetone, methyl ethyl ketone, methyl isobutyl ketone), and an ether (such as dioxane or tetrahydrofuran). The ether may be an alkyleneglycol dialkyl ether such as ethyleneglycol diethyl ether, an alkyleneglycol alkyl ether acetate such as ethyleneglycol monoalkyl ether acetate. These additives may be used alone or in combination of two or more types.

The polarizing lens may be formed (or formed and processed) by various processes. In particular, in the application of an optical member such as sunglasses and eyeglasses, the polarizing lens is often produced by a bending process [for example, a curved shape (such as a convex surface or a spherical surface shape (one surface is convex and the other surface is concave)].

As such, the polarizing lens may be a polarizing lens having a curved shape (or a polarized lens that has been subjected to bending (bending to a convex shape)).

In the polarizing lens having the curved surface shape, the radius of curvature is not particularly limited, and may usually be about from 20 to 140 mm, preferably about from 40 to 120 mm, even more preferably about from 60 to 100 mm.

The polarizing lens having the curved surface shape can be formed by laminating the protective film on at least one surface (in particular, both surfaces) of the polarizing film (usually laminating using an adhesive), and bending it (in particular, bending by thermoforming). The bending process (processing into a curved surface shape) can typically be performed by thermoforming. The thermoforming method is not particularly limited, and examples thereof include methods such as a forming method for a single curved surface, a forming method for a double curved surface (vacuum forming, free blow molding, pressure forming, and heat pressing). A particularly preferred thermoforming method is vacuum forming. The thermoforming temperature is typically a temperature that is about 40 to 50° C. lower than a glass transition temperature Tg of the plastic material forming the protective film (usually 90° C.) to (Tg+20° C.), for example, the temperature may be 90° C. or higher (for example, 90° C. to 200° C.), preferably about 100 to 190° C., even more preferably about 110 to 160° C.

Furthermore, the polarizing lens described above may be formed from a composite laminate having a thermoformable resin layer on at least one of the protective films. The thermoformable resin layer may be formed on both sides of the protective film or may be formed on one side. When forming the thermoformable resin layer on one side, the thermoformable resin layer may typically be formed on a side from which the light exits (a side facing to the eye, or an inner side) of the protective film.

The thermoformable resin layer can be formed according to the resin, thickness, molding method, and the like described in JP 4764350 B.

The protective film in the polarizing lens according to an embodiment of the present invention is preferably formed from a polyamide-based resin. When the protective film is formed from the polyamide-based resin, the design properties are excellent and the forming-processability and mechanical properties (mechanical strength, and the like) are also excellent. Even when the film is subjected to, for example, punching, boring, or the like, molding can be performed without breaking, cracking, or the like. Furthermore, when the film is formed from the polyamide-based resin (in particular, an alicyclic polyamide-based resin), the chemical resistance is excellent, for example, even if it is directly brought into contact with a cellulose acetate resin eyeglass frame containing a plasticizer (diethyl phthalate, or the like), cracking does not occur and thus the durability is high.

Formation of Hard Coating Layer

The hard coating layer in the plastic lens according to an embodiment of the present invention can be formed by applying the curable composition (hard coating agent) according to an embodiment of the present invention prepared as described above onto at least one surface of the plastic lens substrate, and then curing it.

Here, the hard coating layer in the plastic lens according to an embodiment of the present invention may be formed on only one surface (one side) of the plastic lens substrate, or may be formed on both surfaces (both sides) of the plastic lens substrate.

Furthermore, the hard coating layer in the plastic lens according to an embodiment of the present invention may be formed on only a portion of each surface of the plastic lens substrate, or may be formed over the entirety of each surface thereof.

The coating (applying) method of the curable composition (hard coating agent) according to an embodiment of the present invention includes known coating methods such as a dip coating method, spin coating method, spraying method, and flow method, and the hard coating agent can be applied to the plastic lens substrate using the known method. The coated hard coating agent can be cured, for example, by irradiating with the active energy beam and/or heating, if necessary, after the solvent is removed by drying.

As the active energy rays, for example, any of infrared rays, visible rays, ultraviolet rays, X-rays, an electron beam, an α-ray, a β-ray, and a γ-ray can be used. Among these, ultraviolet rays are preferred in terms of excellent handling. The conditions for curing the coated hard coating agent by irradiating with the active energy rays (the irradiation conditions of the active energy rays) are not particularly limited, and can be appropriately adjusted according to the type and energy of the active energy rays to be irradiated and the shape and size of the plastic lens. In the case of the irradiation with ultraviolet rays, for example, the conditions are preferably set to from about 1 to 1000 mJ/cm$^2$. In addition, for example, a high-pressure mercury lamp, an ultra high-pressure mercury lamp, a xenon lamp, a carbon arc, a metal halide lamp, the sunlight, an LED lamp, and a laser can be used for irradiation with active energy rays. After irradiation with active energy rays, the curing reaction can be further allowed to proceed by further subjecting to a heat treatment (annealing and aging).

Alternatively, the conditions for curing the coated hard coating agent by heating are not particularly limited and, for example, preferably from 30 to 200° C., more preferably from 50 to 190° C. The curing time can be appropriately set. Note that, when the hard coating agent is coated on a plastic lens substrate using a thiourethane-based resin as the plastic material, the curing temperature is preferably 130° C. or lower. In a case where the curing is performed at a temperature higher than 130° C., the plastic lens substrate may be deformed or may change color.

The thickness of the hard coating layer according to an embodiment of the present invention (the thickness of each hard coating layer when the hard coating layers according to an embodiment of the present invention are provided on both sides of the plastic lens substrate) is not particularly limited, and is preferably from 1 to 200 μm, more preferably from 3 to 150 μm. In particular, the hard coating layer according to an embodiment of the present invention can maintain a high hardness of the surface (for example, a pencil hardness of H or greater) even when the hard coating layer is thin (for example, a thickness of 5 μm or less). In addition, even if the hard coating layer is thick (for example, a thickness of 50 μm or greater), defects such as crack generation due to curing shrinkage or the like are unlikely to occur, and therefore the pencil hardness can be significantly increased (for example, the pencil hardness can be set to 9H or greater).

The haze of the hard coating layer according to an embodiment of the present invention is not particularly limited, and when the thickness is 50 μm, the haze is preferably 1.5% or less, and more preferably 1.0% or less. In addition, the lower limit of the haze is not particularly limited but is, for example, 0.1%. When the haze is adjusted to particularly 1.0% or less, the lens tends to be suitable for use, for example, in applications of lenses requiring very high transparency. Here, the haze of the hard coating layer according to an embodiment of the present invention can be measured according to JIS K7136.

The total light transmittance of the hard coating layer according to an embodiment of the present invention is not particularly limited, but when the thickness is 50 μm, the total light transmittance is preferably 85% or greater and more preferably 90% or greater. In addition, the upper limit of the total light transmittance is not particularly limited but is, for example, 99%. When the total light transmittance is set to 85% or greater, for example, the lens tends to be suitable for use, for example, in applications of lenses requiring very high transparency. Here, the total light transmittance in the hard coating layer according to an embodiment of the present invention can be measured according to JIS K7361-1.

Formation of Vapor Deposition Coated Film

The vapor deposition coated film can be formed on the surface of the hard coating layer formed on the plastic lens substrate in the method described above.

Note that the vapor deposition coated film according to an embodiment of the present invention in the plastic lens according to an embodiment of the present invention may be formed on only one surface (one side) of the hard layer, or may be formed on both surfaces (both sides) thereof.

Furthermore, the vapor deposition coated film according to an embodiment of the present invention in the plastic lens according to an embodiment of the present invention may be formed on only a portion of each surface of the substrate, or may be formed over the entirety of each surface thereof.

The vapor deposition coated film can be formed by a known vapor deposition coated film treatment, preferably, to the hard coating layer without particular limitation. The vapor deposition coated film is not particularly limited, and examples thereof include antireflective coating (AR coat films) and mirror coating films.

The AR coat film is formed on the hard coating layer, as a single layer or multiple layers of a metal oxide film. As the material of the metal oxide, $SiO_2$, $ZrO_2$, $Al_2O_3$, $TiO_2$, and the like, are commonly used.

The mirror coating film is formed on the hard coating layer as a layer or multiple layers of a metal film. As the material of the metal oxide, $SiO_2$, $ZrO_2$, $Y_2O_3$, $TiO_2$, $Nb_2O_5$, $Al_2O_3$, $Ta_2O_5$, and the like, are commonly used. Examples of the material of the metal film include Cr, Ta, Nb, Ti, Zr, and the like, and these are used in accordance with the hue of the mirror required.

As a method for forming the deposition film such as the vapor deposition coated film of the metal oxide or the metal film, for example, a vacuum deposition method, an ion plating method, a sputtering method, a CVD method, or a precipitation method by chemical reaction in a saturated solution can be used. As the vacuum deposition method, an ion beam assist method in which ion beams are irradiated during the vapor deposition simultaneously may be used.

An organic film may be inserted between the vapor deposition coated films. A material for the organic film is selected considering the refractive index of the hard coating layer or the vapor deposition coated film, and the film can be formed by a coating method having excellent mass manufacturability such as spin coating or dip coating, in addition to the vacuum deposition method.

In addition, when forming the vapor deposition coated film, it is preferable to perform the surface treatment of the hard coating layer in advance. Specific examples of the surface treatment include an acid treatment, an alkali treatment, an ultraviolet irradiation treatment, a plasma treatment by high frequency electrical discharge in an argon or oxygen atmosphere, an ion beam irradiation treatment using argon, oxygen, or nitrogen.

The pencil hardness of the hard coating layer surface in the plastic lens according to an embodiment of the present invention is not particularly limited, and is preferably H or greater, more preferably 2H or greater, even more preferably 6H or greater. Here, the pencil hardness can be evaluated according to the method described in JIS K5600-5-4.

At least one surface of the plastic lens according to an embodiment of the present invention may be further subjected to various known processing treatment, for example, an anti-fogging treatment, an anti-smudge treatment, or the like, or a combination of these plurality of processing treatments.

The anti-fogging treatment can be performed by coating the surface with a hydrophilic resin, and the anti-smudge treatment can be performed by coating the surface with a substance having a low surface tension (a silicone-based or fluorine-based material).

With the plastic lens according to an embodiment of the present invention, the hard coating layer is formed of the cured product of the curable composition (hard coating agent) including the polyorganosilsesquioxane according to an embodiment of the present invention, and therefore, the plastic lens has excellent heat resistance even if the plastic lens is left at an elevated temperature of 90° C. or higher, cracks are not generated in the vapor deposition coated film, and thus cracks are not generate in the hard coating layer. In addition, the plastic lens has the excellent effects of prevention against cracks which are generated when a mechanical stress such as bending or pressing is applied thereto.

Practical benefits include that damages can be avoided even when sunglasses are left inside a vehicle, as described above, and, in addition, various damages caused by a high temperature environments can be avoided and thus the utility value is increased.

Furthermore, in a plastic lens provided with a hard coating and a vapor deposition coated film, a mechanical stress such as bending and compression can develop a crack that is easily visible, but the plastic lens according to an embodiment of the present invention has a significant crack suppression effect even with respect to the mechanical stress.

With respect to the cracks generated by the thermal stress, when a tensile stress is generated, caused by the difference in thermal expansion coefficients between the hard coating layer and the vapor deposition coated film layer, a fine crack is first generated in the vapor deposition coated film layer, and then when the crack propagates to the hard coating layer, they become visible. When mechanical bending stress or the like is applied to the lens, the similar tensile stress in the hard coating layer and the vapor deposition coated film layer can also be present, and thus it is conceived that the present invention has the significant crack suppression effect even under a mechanical stress, with the mechanism similar to the mechanism for the case of the thermal stress.

As the crack suppression effect against the mechanical stress, many advantages can be pointed out in practical use. For example, the significant effect can be exhibited when inserting a lens into a spectacle frame. In particular, when inserting a sunglass lens into a cellulose acetate resin eyeglass frame, the sunglass lens needs to be inserted carefully while the cellulose acetate frame is heated such that the frame is expanded to prevent the generation of cracks on the lens, because there is no adjustment screw in a case of a metal frame. In a case of the plastic lens according to the present invention, the generation of the crack can be prevented even if the lens is inserted laboriously without heating the cellulose acetate frame. In addition, it can be expected that the lens can have an effect capable of withstanding relatively hard use environments when the lens is used as sunglasses.

Accordingly, the plastic lens according to an embodiment of the present invention is useful in eyeglass lens substrates, e.g., optical substrates (or optical members) including sunglasses (including powered sunglasses) and goggles. In particular, when the substrate of the plastic lens according to an embodiment of the present invention is formed of a polyamide-based resin (a non-crystalline or crystalline polyamide-based resin, in particular, an alicyclic polyamide-based resin having microcrystallinity), the plastic lens according to an embodiment of the present invention is useful for a lens (polarizing lens) of eyeglasses (for example, eyeglasses without a frame), because of the excellent molding processability.

EXAMPLE(S)

Hereinafter, the present invention is described in more detail based on examples, but the present invention is not limited by these examples. The molecular weight of a product was measured using an Alliance HPLC system 2695 (available from Waters), a Refractive Index Detector 2414 (available from Waters), columns of Tskgel $GMH_{HR}$-M×2 (available from Tosoh Corporation), a guard column of Tskgel guard column $H_{HR}L$ (available from Tosoh Corporation), a column oven of COLUMN HEATER U-620 (available from Sugai), a solvent of THF, and a measurement condition of 40° C. In addition, the ratio of T2 form and T3 form [T3 form/T2 form] in a product was measured by using a $^{29}$Si-NMR spectrum measurement with JEOL ECA500 (500 MHz).

Preparation Example 1: Preparation of Hard Coating Liquid 1 and Evaluation of Surface Hardness and Scratch Resistance of Hard Coating Film 277.2 mmol (68.30 g) of 2-(3,4-epoxycyclohexyl)ethyltrimethoxysilane, 3.0 mmol (0.56 g) of phenyltrimethoxysilane, and 275.4 g of acetone were charged under a nitrogen stream into a 1000 mL flask (reaction vessel) equipped with a thermometer, a stirrer, a reflux condenser, and a nitrogen inlet tube, and the temperature was raised to 50° C. To the mixture thus obtained, 7.74 g of a 5% potassium carbonate aqueous solution (2.8 mmol as potassium carbonate) was added dropwise over 5 minutes, after which 2800.0 mmol (50.40 g) of water was added dropwise over 20 minutes. Here, no significant temperature increase occurred during the drop-wise additions. Subsequently, a polycondensation reaction was performed under a nitrogen stream for 5 hours while maintaining the temperature at 50° C.

Next, the reaction solution was cooled, and simultaneous thereto, 137.70 g of methyl isobutyl ketone and 100.60 g of a 5% saline solution were added thereto. The solution was transferred to a 1 L separation funnel, and then 137.70 g of methyl isobutyl ketone was again added, and rinsing with water was performed. After the separation, the water layer was removed, and rinsing with water was performed until the lower layer liquid became neutral. The upper layer liquid was then fractioned, after which the solvent was distilled away from the upper layer liquid under conditions of 1 mmHg and 50° C. and 64.15 g of a colorless, transparent liquid product (an alicyclic epoxy group-containing low molecular weight polyorganosilsesquioxane) containing 25 wt. % of methyl isobutyl ketone was obtained.

When the product was analyzed, the number average molecular weight was found to be 1884, and the molecular weight dispersity was 1.52. A ratio of T2 form and T3 form [T3 form/T2 form] calculated from the $^{29}$Si-NMR spectrum of the product was 10.6.

1.09 g of the alicyclic epoxy group-containing low molecular weight polyorganosilsesquioxane obtained as above [0.82 g of the 25 wt. % MIBK-containing product], 13.2 mg of a product with trade name "WPI-124" (available from Wako Pure Chemical Industries, Ltd., a 50% solution of a photoacid generator) [13.2 mg of the 50% solution], 3.3 mg of a product with trade name "BYK-307" (available from BYK Japan KK, a leveling agent), and 0.28 g of methyl isobutyl ketone were charged in a 6 cc brown sample bottle, and the mixture was stirred and mixed using a vibrator to produce a curable composition (hard coating liquid 1).

The hard coating liquid 1 obtained above was cast-coated on a PET film (trade name "A4300" available from TOYOBO Co., Ltd.) to a thickness of the cured hard coating layer of 40 μm using a wire bar. After that, it was allowed to stand in an oven of a temperature of 120° C. for 10 minutes (pre-baking), and then irradiated with ultraviolet rays (irradiation conditions: ultraviolet irradiation dose: 430 mJ/cm$^2$, and irradiation intensity: 160 W/cm$^2$). Finally, the coated film was heat-treated at 80° C. for 2 hours (aging) to cure the coating film of the hard coating liquid 1, thus a hard coating film including the hard coating layer was produced.

The pencil hardness of the surface of the hard coating layer in the hard coating film, obtained above, was evaluated according to JIS K5600-5-4, and the pencil hardness of the surface of the hard coating layer was 9H.

A #0000 steel wool was traveled back and forth on the surface of the hard coating film (the surface of the hard coating layer) obtained above in the predetermined number of times with a load of 1000 g/cm$^2$. The presence or absence of a scratch on the surface was visually checked every 500 times according to the following criteria, whereby the scratch resistance was evaluated.

"Pass": No scratch was observed at a predetermined number of times of the travel "Fail": A scratch was observed at a predetermined number of times of the travel As a result, when the number of times of the travel was 500, the evaluation was "Pass", but when the number of times of the travel was 1000, the evaluation was "Fail".

Preparation Example 2: Preparation of Hard Coating Liquid 2 and Evaluation of Surface Hardness and Scratch Resistance of Hard Coating Film The following operations were performed to increase the molecular weight using 75 g of the colorless, transparent liquid product containing 25 wt. % of methyl isobutyl ketone, produced in Preparation Example 1, (the alicyclic epoxy group-containing low molecular weight polyorganosilsesquioxane).

A mixture (75 g) containing the alicyclic epoxy group-containing low molecular weight polyorganosilsesquioxane obtained in Production Example 1 was charged under a nitrogen stream into a 1000 mL flask (reaction vessel) equipped with a thermometer, a stirrer, a reflux condenser, and a nitrogen inlet tube. Next, 100 ppm (5.6 mg) of potassium hydroxide and 2000 ppm (112 mg) of water were added to the net content (56.2 g) of the alicyclic epoxy group-containing low molecular weight polyorganosilsesquioxane, and the mixture was heated for 3 hours at 80° C., and then, the mixture was sampled, and the molecular weight was measured. It was found that the number average molecular weight Mn was increased to 4200. Next, the mixture was cooled to room temperature, 300 mL of methyl isobutyl ketone was added, and 300 mL of water was added, and when the alkali component was removed through repeated rinsing with water, and the mixture was concentrated. 74.5 g of a colorless, transparent liquid product (alicyclic epoxy-group containing high molecular weight polyorganosilsesquioxane 1 according to an embodiment of the present invention) containing 25 wt. % of methyl isobutyl ketone was obtained.

When the product was analyzed, the number average molecular weight was found to be 4200, and the molecular weight dispersity was 2.2. The ratio of T2 form and T3 form [T3 form/T2 form] calculated from the $^{29}$Si-NMR spectrum of the product was 32.

1.09 g of the alicyclic epoxy group-containing high molecular weight polyorganosilsesquioxane obtained as above [0.82 g of the 25 wt. % MIBK-containing product], 13.2 mg of a product with trade name "WPI-124" (available from Wako Pure Chemical Industries, Ltd., a 50% solution of a photoacid generator) [13.2 mg of the 50% solution], 3.3 mg of a product with trade name "BYK-307" (available from BYK Japan KK, a leveling agent), and 0.28 g of methyl isobutyl ketone were charged in a 6 cc brown sample bottle, and the mixture was stirred and mixed using a vibrator to produce a curable composition (hard coating liquid 2).

The hard coating liquid 2 obtained above was cast-coated on a PET film (trade name "A4300" available from TOYOBO Co., Ltd.) to a thickness of the cured hard coating layer of 40 μm using a wire bar. After that, it was allowed to stand in an oven of a temperature of 120° C. for 10 minutes (pre-baking), and then irradiated with ultraviolet rays (irradiation conditions: ultraviolet irradiation dose: 430 mJ/cm$^2$, and irradiation intensity: 160 W/cm$^2$). Finally, the coated film was heat-treated at 80° C. for 2 hours (aging) to cure the coating film of the hard coating liquid 2, thus a hard coating film including the hard coating layer was produced.

The pencil hardness of the surface of the hard coating layer in the hard coating film, obtained above, was evaluated according to JIS K5600-5-4, and the pencil hardness of the surface of the hard coating layer was 9H.

A #0000 steel wool was traveled back and forth on the surface of the hard coating film (the surface of the hard coating layer) obtained above in the predetermined number of times with a load of 1000 g/cm$^2$. The presence or absence of a scratch on the surface was visually checked every 500 times according to the following criteria, whereby the scratch resistance was evaluated.

"Pass": No scratch was observed at a predetermined number of times of the travel "Fail": A scratch was observed at a predetermined number of times of the travel As a result, when the number of times of the travel was 500, the evaluation was "Pass", but when the number of times of the travel was 1000, the evaluation was "Fail".

Comparative Preparation Example 1: Preparation of Hard Coating Liquid 3 and Evaluation of Surface Hardness and Scratch Resistance of Hard Coating Film 300.0 mmol (70.9 g) of 3-glycidyloxy propyltrimethoxysilane, and 283.6 g of acetone were charged under a nitrogen stream into a 1000 mL flask (reaction vessel) equipped with a thermometer, a stirrer, a reflux condenser, and a nitrogen inlet tube, and the temperature was raised to 50° C. To the mixture thus obtained, 8.29 g of a 5% potassium carbonate aqueous solution (3.0 mmol of potassium carbonate) was added dropwise over 5 minutes, to which 3000.0 mmol (54.00 g) of water was added dropwise over 20 minutes. Here, no significant temperature increase occurred during the drop-wise additions. Subsequently, a polycondensation reaction was performed under a nitrogen stream for 5 hours while maintaining the temperature at 50° C.

Next, the reaction solution was cooled and, simultaneously, 141.8 g of methyl isobutyl ketone and 104.2 g of a 5% saline solution were added. The solution was transferred to a 1 L separation funnel, then 141.8 g of methyl isobutyl ketone was added again, and rinsing with water was performed. After the separation, the water layer was removed, and rinsing with water was performed until the lower layer liquid became neutral. The upper layer liquid was then fractioned, after which the solvent was distilled away from the upper layer liquid under conditions of 1 mmHg and 50° C. and 67.40 g of a colorless, transparent liquid product (a glycidyl group-containing low molecular weight polyorganosilsesquioxane) containing 25 wt. % of methyl isobutyl ketone was obtained.

When the product was analyzed, the number average molecular weight was found to be 1568, and the molecular weight dispersity was 1.36. A ratio of T2 form and T3 form [T3 form/T2 form] calculated from the $^{29}$Si-NMR spectrum of the product was 17.1.

1.09 g of the glycidyl group-containing low molecular weight polyorganosilsesquioxane obtained as above [0.82 g of the 25 wt. % MIBK-containing product], 14.3 mg of a product with trade name "WPI-124" (available from Wako Pure Chemical Industries, Ltd., a 50% solution of a photoacid generator) [14.3 mg of the 50% solution], 3.6 mg of a product with trade name "BYK-307" (available from BYK Japan KK, a leveling agent), and 0.20 g of methyl isobutyl ketone were charged in a 6 cc brown sample bottle, and the mixture was stirred and mixed using a vibrator to produce a curable composition (hard coating liquid 3).

The hard coating liquid 3 obtained above was cast-coated on a PET film (trade name "A4300" available from TOYOBO Co., Ltd.) to a thickness of the cured hard coating layer of 40 μm using a wire bar. After that, it was allowed to stand in an oven of a temperature of 120° C. for 10 minutes (pre-baking), and then irradiated with ultraviolet rays (irradiation conditions: ultraviolet irradiation dose: 430 mJ/cm$^2$, and irradiation intensity: 160 W/cm$^2$). Finally, the coated film was heat-treated at 80° C. for 2 hours (aging) to cure the coating film of the hard coating liquid 3, thus a hard coating film including the hard coating layer was produced.

The pencil hardness of the surface of the hard coating layer in the hard coating film, obtained above, was evaluated according to JIS K5600-5-4, and the pencil hardness of the surface of the hard coating layer was 2H. A #0000 steel wool was traveled back and forth on the surface of the hard coating film (the surface of the hard coating layer) obtained above in the predetermined number of times with a load of 1000 g/cm$^2$. The presence or absence of a scratch on the surface was visually checked every 10 times according to the following criteria, whereby the scratch resistance was evaluated.

"Pass": No scratch was observed at a predetermined number of times

"Fail": A scratch was observed at a predetermined number of times

As a result, when the number of times of the travel was 10, the evaluation was "Pass", but when the number of times of the travel was 20, the evaluation was "Fail".

Example 1: Production and Evaluation of Thermal Cracking of Hard Coating Lens 1 with AR Coat Preparation of Hard Coating Liquid 4

54.7 of an alicyclic epoxy group-containing low molecular weight polyorganosilsesquioxane, obtained in the same manner as in Preparation Example 1 [41 g of the 25 wt. % MIBK-containing product], 1.0 g of a product with trade name "SAN-AID SI-100" (available from Sanshin Chemical Industry Co., Ltd., a thermocationic polymerization initiator), 0.25 g of a product with trade name "SURFLON S-243" (available from AGC Seimi Chemical Co., Ltd., a fluorine-based leveling agent), and 150 g of ethyl acetate were charged into a 500 cc dark brown sample bottle, and the mixture was stirred and mixed using a vibrator to prepare a curable composition (hard coating liquid 4).

Production of Hard Coating Lens 1

A lens mold was attached to an injection molding machine (Tuparl TR150S available from Sodic Plastech), and a transparent nylon resin (TROGAMID CX7323, available from Daicel-Evonik Ltd., a refractive index: 1.52) was injection-molded to produce a plastic lens 1 for coating (76 φ mm, a thickness at the center portion: 2.2 mm, equivalent to a curve with a curvature of 6).

The hard coating liquid 4, obtained above, was applied to a convex surface and a concave surface of the plastic lens 1 for coating by a dipping method to a thickness of the cured hard coating layer of 2.5 μm, and then it was heat treated in an oven of a temperature of 100° C. for 4 hours to produce a hard coating lens 1.

Antireflective Coating (AR Coat Film) Vapor Deposition

The hard coating lens 1 obtained above was placed in a vacuum deposition apparatus, and three layers of metal oxide films (the first layer on the hard coating side: $SiO_2$ layer, about 64 nm; the second layer: $ZrO_2$ layer, about 128 nm; the third layer: $SiO_2$ layer, about 64 nm, the total thickness: about 256 nm) were formed on the concave hard coating layer in a vacuum deposition to produce a hard coating lens 1 with AR coat.

Cracking Evaluation after Heat Treatment

The hard coating lens 1 with the AR coat, obtained above, was heat treated in an electrical dryer of a temperature of 90° C. for 60 minutes, and it was allowed to stand in a room temperature environment of 23° C. for one hour. Then, the lens was visually observed using a LED light source for lens inspection (a visual inspection lamp NS-100NW (Y), illuminance setting: 30000 lx/200 mm, available from NAGATA). As a result, a crack could not be confirmed on the concave surface portion.

A cross section of the hard coating lens 1 with the AR coat layer after the heat treatment was produced using a cross session polisher apparatus (IB-09020 CP, available from JEOL Ltd.), and a scanning electron microscope (SEM) photograph of the cross section was taken using a Schottky electric field emission scanning electron microscope (JSM-7800, available from JEOL Ltd.). The results are shown in FIG. 1.

Example 2: Production and Thermal Cracking Evaluation of Hard Coating Lens 2 with AR Coat Preparation of Hard Coating Liquid 5

54.7 g of an alicyclic epoxy group-containing high molecular weight polyorganosilsesquioxane, obtained in the same manner as in Preparation Example 2 [41 g of 25 wt. % MIBK-containing product], 1.0 g of a product with trade name "SAN-AID SI-100" (available from Sanshin Chemical Industry Co., Ltd., a thermal cationic polymerization initiator), 0.25 g of a product with trade name "SURFLON S-243" (available from AGC Seimi Chemical Co., Ltd.), a fluorine-based leveling agent), and 150 g of ethyl acetate were charged into a 500 cc dark brown sample bottle, and the mixture was stirred and mixed using a vibrator to prepare a curable composition (hard coating liquid 5).

Production of Hard Coating Lens 2

The hard coating liquid 5, obtained in the similar manner as in Example 1, was applied to a convex surface and a concave surface of the plastic lens 1 for coating by a dipping method to a thickness of the cured hard coating layer of 2.5 µm, and then it was heat treated in an oven of a temperature of 100° C. for 4 hours to produce a hard coating lens 2.

Antireflective Coating (AR Coat Film) Vapor Deposition

The hard coating lens 2 obtained above was placed in a vacuum deposition apparatus, and three layers of metal oxide films (the first layer on the hard coating side: $SiO_2$ layer, about 64 nm; the second layer: $ZrO_2$ layer, about 128 nm; the third layer: $SiO_2$ layer, about 64 nm, the total thickness: about 256 nm) were formed on the concave hard coating layer in a vacuum deposition to produce a hard coating lens 2 with AR coat.

Cracking Evaluation after Heat Treatment

The hard coating lens 2 with the AR coat, obtained above, was heat treated in an electrical dryer of a temperature of 90° C. for 60 minutes, and it was allowed to stand in a room temperature environment of 23° C. for one hour. Then, the lens was visually observed using a LED light source for lens inspection (a visual inspection lamp NS-100NW (Y), illuminance setting: 30000 lx/200 mm, available from NAGATA). As a result, a crack could not be confirmed on the concave surface portion.

Comparative Example 1: Production and Thermal Cracking Evaluation of Coated Hard Coating Lens 3 with AR Coat Preparation of Hard Coating Liquid 6

3 moles of methyltriethoxysilane (534 g), 9 mol of water (162 g), and 0.05 mmol of 0.1 N hydrochloric acid (0.5 ml) was charged under a nitrogen stream into a 1000 milliliter flask (reactor) equipped with a thermometer, a stirrer, a reflux condenser, and a nitrogen inlet, and the mixture was thoroughly mixed. When the mixture was heated for 4 hours under reflux at 80° C., the liquid was first heterogeneous, but it became a transparent uniform layer. Ethanol (including some water) was then removed by distillation and was concentrated to give a solution having a solid content of 50%, and the solution was aged under reflux for 20 hours. The solution was subjected to evaporation of the solvent in a thin evaporator in a short period of time, within 1 minute, to obtain a hydrolytic condensate of solid-clake like solvent-soluble methyltriethoxysilane (a methyl group-containing polyorganosilsesquioxane).

27 g of ethanol and 3 g of deionized water were mixed in a 500 milliliter flask, to prepare 10% water-containing ethanol, to which 30 g of the solid clake of the hydrolytic condensate of methyltriethoxysilane, obtained above, was added, and the mixture was strongly stirred for about 40 minutes, and was completely dissolved to prepare a 50% solution of the hydrolytic condensate of methyltriethoxysilane. Separately, 23 g of ethanol, 2 g of deionized water, 1 g of a phenol salt of 1,8-diazabicyclo[5.4.0]undecene-7 (strong alkaline curing agent), and 1 g of a product with trade name "Ftergent 100" (available from NEOS Corporation, a fluorine-based leveling agent), and 13 g of acetic acid were added in this order, and the mixture was mixed thoroughly to prepare a catalyst solution. The 50% solution of the hydrolytic condensate of methyltriethoxysilane described above and the catalyst solution were stirred and mixed to produce a curable composition (hard coating liquid 6).

Production of Hard Coating Lens 3

The hard coating liquid 6, obtained in the similar manner as in Example 1, was applied to a convex surface and a concave surface of the plastic lens 1 for coating by a dipping method to a thickness of the cured hard coating layer of 2.5 µm, and then it was heat treated in an oven of a temperature of 100° C. for 4 hours to produce a hard coating lens 3.

Antireflective Coating (AR Coat Film) Vapor Deposition

The hard coating lens 3 obtained above was placed in a vacuum deposition apparatus, and three layers of metal oxide films (the first layer on the hard coating side: $SiO_2$ layer, about 64 nm; the second layer: $ZrO_2$ layer, about 128 nm; the third layer: $SiO_2$ layer, 64 nm, the total thickness: about 256 nm) were formed on the concave hard coating layer in a vacuum deposition to produce a hard coating lens 3 with AR coat.

Cracking Evaluation after Heat Treatment

The hard coating lens 3 with the AR coat, obtained above, was heat treated in an electrical dryer of a temperature of 90° C. for 60 minutes, and it was allowed to stand in a room temperature environment of 23° C. for one hour. Then, the lens was visually observed using a LED light source for lens inspection (a visual inspection lamp NS-100NW (Y), illuminance setting: 30000 lx/200 mm, available from NAGATA). As a result, a large number of cracks were confirmed on the concave surface.

Figure 2:
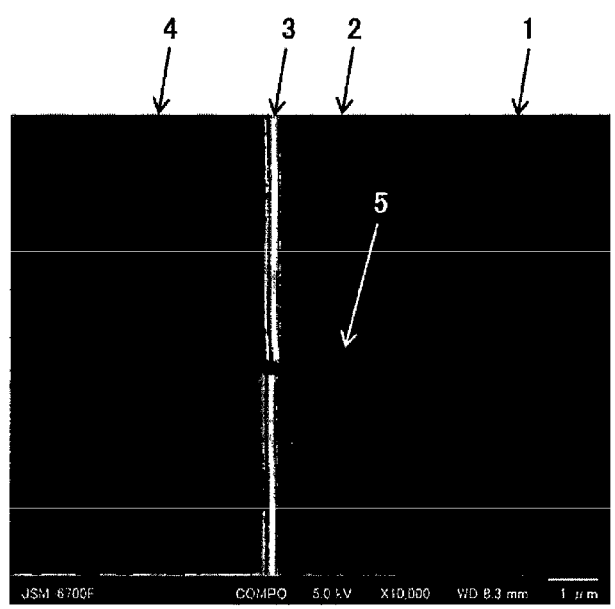
FIG. 2 is a scanning electron microscope (SEM) photograph of a cross section of a hard coating lens 2 with an AR layer after a heat treatment, in which cracks generated in a vapor deposition coated film were propagated to the hard coating, and further propagated to the substrate plastic part. (Comparative Example 1)
Figure 3:
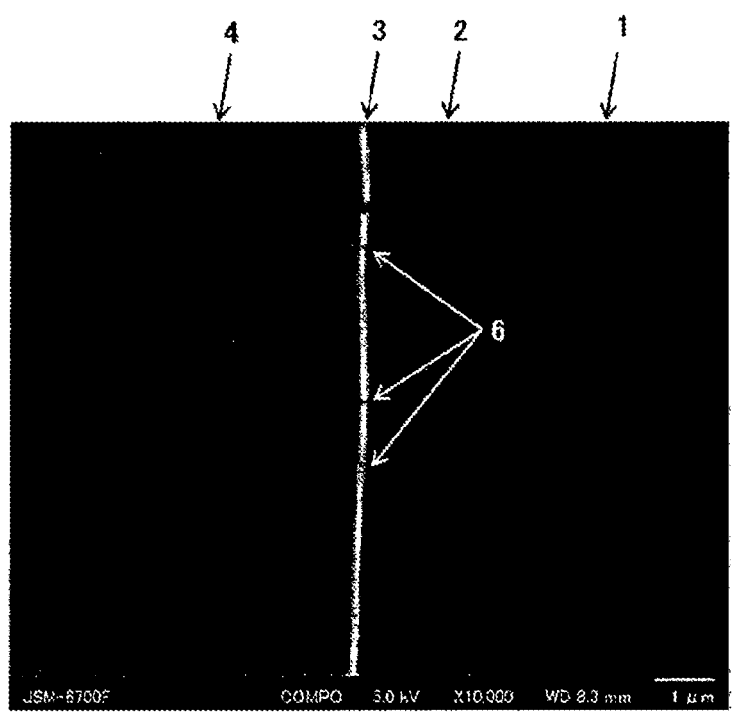
FIG. 3 is a scanning electron microscope (SEM) photograph of a cross section of the hard coating lens 2 with the AR layer after the heat treatment, and the portion of the crack that has been generated in the vapor deposition coated film but has not yet been propagated to the hard coating was observed. (Comparative Example 1)

A cross section of the hard coating lens 3 with the AR coat layer after the heat treatment was produced using a cross session polisher apparatus (IB-09020 CP, available from JEOL Ltd.), and a scanning electron microscope (SEM) photograph of the cross section was taken using a Schottky electric field emission scanning electron microscope (JSM-7800, available from JEOL Ltd.). The results are shown in FIG. 2 and FIG. 3.

Example 3: Production and Thermal Cracking Evaluation of Hard Coating Lens 1 with Mirror Coating Deposition of Mirror Coating A blue mirror coating film was formed on a convex surface of the hard coating layer of the hard coating lens 1, obtained in Example 1, using a vacuum deposition apparatus, whereby a hard coating lens 1 with a mirror coating was produced.

Cracking Evaluation after Heat Treatment

The hard coating lens 1 with the mirror coating, obtained above, was heat treated in an electrical dryer of a temperature of 90° C. for 60 minutes, and it was allowed to stand in a room temperature environment of 23° C. for one hour. Then, the lens was visually observed using a LED light source for lens inspection (a visual inspection lamp NS-100NW (Y), illuminance setting: 30000 1x/200 mm, available from NAGATA). As a result, cracks could not be confirmed on both of the convex surface and the concave surface portions.

Comparative Example 2: Production and Thermal Cracking Evaluation of Hard Coating Lens 2 with Mirror Coating Deposition of Mirror Coating A blue mirror coating film was formed on a convex surface of the hard coating layer of the hard coating lens 3, obtained in Comparative Example 1, using a vacuum deposition apparatus, whereby a hard coating lens 2 with a mirror coating was produced.

Crack Evaluation after Heat Treatment

The hard coating lens 2 with the mirror coating, obtained above, was heat treated in an electrical dryer of a temperature of 90° C. for 60 minutes, and it was allowed to stand in a room temperature environment of 23° C. for one hour. Then, the lens was visually observed using a LED light source for lens inspection (a visual inspection lamp NS-100NW (Y), illuminance setting: 30000 1x/200 mm, available from NAGATA). As a result, a large number of cracks were generated on the convex surface.

Example 4: Production and Pressurized Cracking Evaluation of Hard Coating Lens 1 with AR Coat and Mirror Coating Formation of Vapor Deposition Coated Film A blue mirror coating film, which was similar to the one obtained in Example 3, was formed on a convex surface of the hard coating layer in the hard coating lens 1 obtained in Example 1 using a vacuum deposition apparatus, and an AR coat film, which was similar to the one obtained in Example 1, was formed on a concave surface of the hard coating layer, whereby a hard coating lens 1 with the AR coat and the mirror coating was produced.

Cracking Evaluation after Pressurization

The hard coating lens 1 with the AR coat and the mirror coating, obtained above, was pressurized using a pressurizing tool defined in the UK and European Eyeglass Lens Standard EN 168: 1995 4.1.1 (pressure: 100 N±2 N, tip steel ball diameter in pressurizing part: 22 mm) in a room temperature environment of 23° C. from the convex side for 60 seconds, and was left in a room temperature environment of 23° C. for 24 hours. After that, the lens was visually observed using a LED light source for lens inspection (a visual inspection lamp NS-100NW (Y), illuminance setting: 30000 1x/200 mm, available from NAGATA). As a result, cracks could not be confirmed on either the convex surface (mirror coating surface) or the concave surface (AR coat surface).

Comparative Example 3: Production and Pressurized Cracking Evaluation of Hard Coating Lens 2 with AR Coat and Mirror Coating Formation of Vapor Deposition Coated Film A blue mirror coating film, which was similar to the one obtained in Example 3, was formed on a convex surface of the hard coating layer in the hard coating lens 3 obtained in Comparative Example 1 using a vacuum deposition apparatus, and an AR coat film, which was similar to the one obtained in Example 1, was formed on a concave surface, whereby a hard coating lens 2 with the AR coat and the mirror coating was produced.

Cracking Evaluation after Pressurization

The hard coating lens 2 with the AR coat and the mirror coating, obtained above, was pressurized using a pressurizing tool defined in the UK and European Eyeglass Lens Standard EN 168: 1995 4.1.1 (pressure: 100 N±2 N, tip steel ball diameter in pressurizing part: 22 mm) in a room temperature environment of 23° C. from the convex side for 60 seconds, and was left in a room temperature environment of 23° C. for 24 hours. After that, the lens was visually observed using a LED light source for lens inspection (a visual inspection lamp NS-100NW (Y), illuminance setting: 30000 1x/200 mm, available from NAGATA). As a result, slight radial cracks were observed on the convex surface (mirror coating surface), and a large number of radial cracks were confirmed on the concave surface (AR coat surface).

Variations of embodiments of the present invention described above are additionally described below.

[1] A plastic lens containing: a plastic lens substrate; a hard coating layer formed on at least one surface of the plastic lens substrate; and a vapor deposition coated film formed on at least one surface of the hard coating layer, the hard coating layer being a cured product of a curable composition containing a polyorganosilsesquioxane described below, the polyorganosilsesquioxane containing a constituent unit represented by Formula (1):

[Chem. 28]

$$[R^1 SiO_{3/2}] \qquad (1)$$

where $R^1$ represents a group containing an alicyclic epoxy group (preferably a 3,4-epoxycyclohexyl group), a constituent unit represented by Formula (I) (hereinafter which may be referred to as "T3 form"):

[Chem. 29]

$$[R^a SiO_{3/2}] \qquad (I)$$

where $R^a$ represents a group containing an alicyclic epoxy group (preferably a 3,4-epoxycyclohexyl group), a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom, a constituent unit represented by Formula (II) (hereinafter may be referred to as "T2 form"):

[Chem. 30]

$$[R^bSiO_{2/2}(OR^c)] \quad (II)$$

where $R^b$ represents a group containing an alicyclic epoxy group (preferably a 3,4-epoxycyclohexyl group), a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and $R^c$ represents a hydrogen atom or an alkyl group having from 1 to 4 carbons] and a constituent unit expressed by Formula (4) below:

[Chem. 31]

$$[R^1SiO_{2/2}(OR^c)] \quad (4)$$

where in Formula (4), $R^1$ is the same as in Formula (1), and $R^c$ is the same as in Formula (II); wherein
a molar ratio of the constituent unit represented by Formula (I) and the constituent unit (II) represented by Formula (II), [(constituent unit represented by Formula (I)/(constituent unit represented by Formula (II)], is from 5 or greater and 500 or less,
a proportion of the constituent unit represented by Formula (1) and the constituent unit represented by Formula (4) relative to the total amount (100 mol %) of siloxane constituent units is from 55 to 100 mol %;
a number average molecular weight is from 1000 to 50000; and
a molecular weight dispersity (a weight average molecular weight/a number average molecular weight) is from 1.0 to 4.0.

[2] The plastic lens according to [1], wherein the polyorganosilsesquioxane contains constituent units represented by Formula (2) below:

[Chem. 32]

$$[R^2SiO_{3/2}] \quad (2)$$

where $R^2$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.

[3] The plastic lens according to [2], wherein the group $R^2$ represents a substituted or unsubstituted aryl group (preferably a phenyl group).

[4] The plastic lens according to any one of [1] to [3], wherein the group containing the alicyclic epoxy group is represented by Formula (1a):

[Chem. 33]

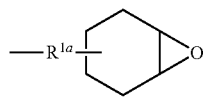

(1a)

where $R^{1a}$ represents a linear or branched alkylene group (preferably an ethylene group or a trimethylene group, more preferably an ethylene group), or a group represented by Formula (1b)

[Chem. 34]

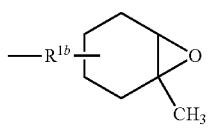

(1b)

where $R^{1b}$ represents a linear or branched alkylene group (preferably an ethylene group or a trimethylene group, more preferably an ethylene group).

[5] The plastic lens according to [4], wherein $R^1$ is the group represented by Formula (1a), and the group $R^{1a}$ is an ethylene group (in particular, 2-(3,4-epoxycyclohexyl)ethyl group).

[6] The plastic lens according to any one of [1] to [5], wherein the ratio [T3 form/T2 form] is 5 or more and less than 20.

[7] The plastic lens according to [6], wherein the lower limit of the ratio [T3 form/T2 form] is 6 (preferably 7).

[8] The plastic lens according to [6] or [7], wherein the upper limit of the ratio [T3 form/T2 form] is 18 (preferably 16, more preferably 14).

[9] The plastic lens according to any one of [1] to [5], wherein the ratio [T3 form/T2 form] is 20 or more and 500 or less.

[10] The plastic lens according to [9], wherein the lower limit of the ratio [T3 form/T2 form] is 21 (preferably 23, more preferably 25).

[11] The plastic lens according to [9] or [10], wherein the upper limit of the ratio [T3 form/T2 form] is 100 (preferably 50, more preferably 40).

[12] The plastic lens according to any one of [1] to [11], wherein the ratio (total amount) of the constituent unit represented by Formula (1) above and the constituent unit represented by Formula (4) above relative to the total amount (100 mol %) of the siloxane constituent units in the polyorganosilsesquioxane is from 65 to 100 mol % (preferably, from 80 to 99 mol %).

[13] The plastic lens according to any one of [1] to [12], wherein the ratio (total amount) of the constituent unit represented by Formula (2) above and the constituent unit represented by Formula (5) above relative to the total amount (100 mol %) of siloxane constituent units in the polyorganosilsesquioxane is from 0 to 70 mol % (preferably from 0 to 60 mol %, more preferably from 0 to 40 mol %, and particularly preferably from 1 to 15 mol %).

[14] The plastic lens according to any one of [1] to [13], wherein the ratio (total amount) of the constituent unit represented by Formula (1) above, the constituent unit represented by Formula (2) above, the constituent unit represented by Formula (4) above, and the constituent unit represented by Formula (5) above relative to the total amount (100 mol %) of siloxane constituent units in the polyorganosilsesquioxane is from 60 to 100 mol % (preferably from 70 to 100 mol %, more preferably from 80 to 100 mol %).

[15] The plastic lens according to any one of [1] to [8] and [12] to [14], wherein the number average molecular weight (Mn) of the polyorganosilsesquioxane is from 1000 to 3000 (preferably from 1000 to 2800, more preferably from 1100 to 2600).

[16] The plastic lens according to any one of [1] to [5] and [9] to [14], wherein the number average molecular weight (Mn) of the polyorganosilsesquioxane is from 2500 to 50000 (preferably from 2800 to 10000, more preferably from 3000 to 8000).

[17] The plastic lens according to any one of [1] to [8] and [9] to [15], wherein the molecular weight dispersity (Mw/Mn) of the polyorganosilsesquioxane is from 1.0 to 3.0 (preferably from 1.1 to 2.0, more preferably from 1.2 to 1.9).

[18] The plastic lens according to any one of [1] to [5], [9] to [14], and [16], wherein the molecular weight dispersity (Mw/Mn) of the polyorganosilsesquioxane is from 1.1 to 3.0 (preferably from 1.2 to 2.5).

[19] The plastic lens according to any one of [1] to [18], wherein the polyorganosilsesquioxane has a 5% weight loss temperature ($T_{d5}$) in an air atmosphere of 330° C. or higher (for example, from 330 to 450° C., preferably 340° C. or higher, and more preferably 350° C. or higher).

[20] The plastic lens according to any one of [1] to [19], wherein the polyorganosilsesquioxane in the curable composition is included in a content (blended amount) of 80 wt. % or greater (preferably 85 wt. % or greater, more preferably 90 wt. % or greater, even more preferably 94 wt. % or greater, still more preferably 95 wt. % or greater, particularly preferably 96 wt. % or greater) relative to the total solid content (100 wt. %) of the curable composition excluding volatile components.

[21] The plastic lens according to any one of [1] to [20], wherein the polyorganosilsesquioxane in the curable composition is included in a content (blended amount) of less than 100 wt. % (preferably from 99.8 wt. % or less, more preferably 99.5 wt. % or less) relative to the total solid content (100 wt. %) of the curable composition excluding volatile components.

[22] The plastic lens according to any one of [1] to [21], wherein the cationically curable composition in the curable composition is included in a content (blended amount) from 80 to 100 wt. % (preferably from 85 to 98 wt. %, more preferably from 90 to 95 wt. %) relative to the total solid content (100 wt. %) of the curable composition excluding volatile components.

[23] The plastic lens according to any one of [1] to [22], wherein the curable composition further contains a curing catalyst.

[24] The plastic lens according to [23], wherein the curing catalyst is a photocationic polymerization initiator.

[25] The plastic lens according to [23], wherein the curing catalyst is a thermal cationic polymerization initiator.

[26] The plastic lens according to any one of [23] to [25], wherein the curing catalyst in the curable composition is included in a content (blended amount) of from 0.01 to 10.0 parts by weight (preferably from 0.05 to 7.5 parts by weight, more preferably from 0.1 to 6.0 parts by weight, even more preferably from 0.3 to 6.0 parts by weight), based on 100 parts by weight of the polyorganosilsesquioxane.

[27] The plastic lens according to any one of [1] to [26], wherein the curable composition further contains a vinyl ether compound.

[28] The plastic lens according to any one of [1] to [27], wherein the curable composition further contains a vinyl ether compound having a hydroxyl group in the molecule.

[29] The plastic lens according to any one of [1] to [28], wherein the curable composition further comprises a leveling agent.

[30] The plastic lens according to [29], wherein the leveling agent is at least one agent selected from the group consisting of a silicone-based leveling agent and a fluorine-based leveling agent (preferably a fluorine-based leveling agent).

[31] The plastic lens according to [29] or [30], wherein the leveling agent is included in a ratio of from 0.01 to 20 parts by weight, (preferably from 0.05 to 15 parts by weight, more preferably from 0.1 to 10 parts by weight, even more preferably from 0.13 to 5 parts by weight) based on 100 parts by weight of the polyorganosilsesquioxane.

[32] The plastic lens according to any one of [1] to [31], wherein the plastic lens substrate contains at least one resin selected from the group consisting of polyamide-based resins, polycarbonate-based resins, acrylic resins, allyl-based resins, urethane-based resins, and thiourethane based resins.

[33] The plastic lens according to [32], wherein the plastic lens substrate contains a polyamide-based resin.

[34] The plastic lens according to [32] or [33], wherein the polyamide-based resin is at least one resin selected from the group consisting of aliphatic polyamide-based resins, alicyclic polyamide-based resins, and aromatic polyamide-based resins (preferably an alicyclic polyamide-based resin).

[35] The plastic lens according to [34], wherein the alicyclic polyamide-based resin contains an alicyclic polyamide represented by Formula (7) below.

[Chem. 35]

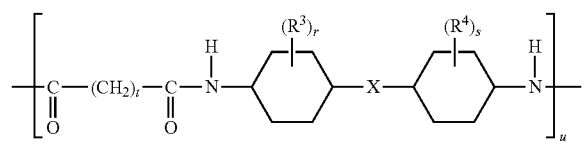

where X represents a direct bond, an alkylene group, or an alkenylene group; $R^3$ and $R^4$ represent the same or different alkyl groups; r and s represent integers of 0 or 1 to 4; t and u represent integers 1 or greater.

[36] The plastic lens according to any one of [32] to [35], wherein the polyamide-based resin has a number average molecular weight from 6000 to 300000 (preferably from 10000 to 200000, more preferably from 20000 to 200000).

[37] The plastic lens according to any one of [32] to [36], wherein the polyamide-based resin has a degree of crystallinity from 1 to 20% (preferably from 1 to 10%, more preferably from 1 to 8%).

[38] The plastic lens according to any one of [32] to [37], wherein the polyamide-based resin has a heat melt temperature (Tm) of 100 to 300° C. (preferably 110 to 280° C., more preferably 130 to 260° C.).

[39] The plastic lens according to any one of [32] to [38], wherein the polyamide-based resin has an Abbe number of 30 or greater (for example, about 32 to 65), preferably 35 or greater (for example, about from 35 to 65), more preferably 40 or greater (for example, about from 40 to 60), even more preferably 42 or greater (for example, about from 42 to 58), particularly preferably 44 or greater (for example, about from 44 to 55).

[40] The plastic lens according to any one of [1] to [39], wherein the plastic lens substrate is a polarizing lens.

[41] The plastic lens according to any one of [1] to [40], wherein the plastic lens substrate is a polarizing lens having a polarizing film and a protective film laminated onto at least one surface of the polarizing film, in which the protective film contains at least one resin selected from the group consisting of polyamide-based resins, polycarbonate-based resins, acrylic resins, allyl-based resins, urethane-based resins, and thiourethane-based resins.

[42] The plastic lens according to [41], wherein the protective film contains a polyamide-based resin.

[43] The plastic lens according to [41] or [42], wherein the polarizing film is a polyvinyl alcohol-based polarizing film.

[44] The plastic lens according to any one of [1] to [43], wherein the hard coating layer has a thickness from 1 to 200 μm (preferably from 3 to 150 μm).

[45] The plastic lens according to any one of [1] to [44], wherein the hard coating layer has a haze of 1.5% or less (preferably 1.0% or less), in a case where the hard coating layer has a thickness of 50 μm.

[46] The plastic lens according to any one of [1] to [45], wherein the hard coating layer has a total light transmittance of 85% or greater (preferably 90% or greater), in a case where the hard coating layer has a thickness of 50 μm.

[47] The plastic lens according to any one of [1] to [46], wherein the hard coating layer surface has a pencil hardness of H or greater (preferably 2H or greater, more preferably 6H or greater).

[48] The plastic lens according to any one of [1] to [47], wherein the vapor deposition coated film is a mirror coating.

[49] The plastic lens according to any one of [1] to [47], wherein the vapor deposition coated film is an antireflective film.

[50] The plastic lens according to any one of [1] to [49], wherein the vapor deposition coated film is a laminate of a plurality of inorganic layers.

[51] The plastic lens according to any one of [1] to [50], wherein the lens is a lens for eyeglasses or sunglasses.

[52] Eyeglasses or sunglasses containing the plastic lens described in [51].

INDUSTRIAL APPLICABILITY

The plastic lenses according to an embodiment of the present invention are useful as an optical substrate (or an optical member) such as a lens substrate for eyeglasses, for example sunglasses (including powered sunglasses) and goggles.

REFERENCE SIGNS LIST

1 Plastic lens substrate
2 Hard coating layer
3 AR coat film
4 Concave surface side of a plastic lens
5 Cracks propagated to a hard coating film
6 Cracks generated in an AR coat film

The invention claimed is:

1. A plastic lens comprising: a plastic lens substrate; a hard coating layer formed on at least one surface of the plastic lens substrate; and a vapor deposition coated film formed on at least one surface of the hard coating layer, the hard coating layer being a cured product of a curable composition containing a polyorganosilsesquioxane, wherein the plastic lens substrate contains an alicyclic polyamide-based resin;

wherein the polyorganosilsesquioxane contains a constituent unit represented by Formula (I);

  (I)

wherein $R^a$ in Formula (I) represents a group containing an alicyclic epoxy group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom;

wherein at least one constituent unit represented by Formula (I) has $R^a$ as the group containing the alicyclic epoxy group;

wherein the $R^a$ as the group containing the alicyclic epoxy group is a group containing a 3,4-epoxycyclohexyl group represented by Formula (1a):

wherein $R^{1a}$ represents an ethylene group;

wherein at least one constituent unit represented by Formula (I) has a further $R^a$ as a phenyl group;

wherein the polyorganosilsesquioxane further contains a constituent unit represented by Formula (II):

  (II)

wherein $R^b$ in Formula (II) represents a group containing an alicyclic epoxy group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and wherein $R^c$ in Formula (II) represents a hydrogen atom or an alkyl group having from 1 to 4 carbons;

wherein at least one constituent unit represented by Formula (II) has $R^b$ as the group containing the alicyclic epoxy group;

wherein the $R^b$ as the group containing the alicyclic epoxy group is a group containing a 3,4-epoxycyclohexyl group represented by Formula (1a):

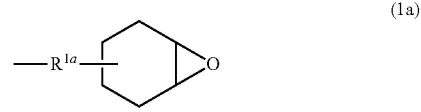

wherein $R^{1a}$ represents an ethylene group;

wherein at least one constituent unit represented by Formula (II) has a further $R^b$ as a phenyl group;

wherein a molar ratio of the constituent unit represented by Formula (I) and the constituent unit (II) represented by Formula (II), [(constituent unit represented by Formula (I))/(constituent unit represented by Formula (II))], is 10.6 or greater and 32 or less;

wherein a proportion of the constituent unit represented by Formula (I) having $R^a$ as the group containing the alicyclic epoxy group and the constituent unit represented by Formula (II) having $R^b$ as the group containing the alicyclic epoxy group relative to the total amount (100 mol %) of siloxane constituent units is from 80 to 99 mol %;

wherein a number average molecular weight of the polyorganosilsesquioxane is from 1884 to 4200;

wherein a molecular weight dispersity of the polyorganosilsesquioxane, weight average molecular weight/number average molecular weight, is from 1.5 to 2.2;

wherein a content of the polyorganosilsesquioxane in the curable composition is from 80 wt. % to less than 100 wt. % relative to a total solid content of the curable composition excluding volatile components; and wherein the curable composition further contains a fluorine-based leveling agent in a ratio of from 0.07 to 1 parts by weight based on 100 parts by weight of the polyorganosilsesquioxane.

2. The plastic lens according to claim 1, wherein the curable composition further contains a curing catalyst.

3. The plastic lens according to claim 2, wherein the curing catalyst is a photocationic polymerization initiator.

4. The plastic lens according to claim 2, wherein the curing catalyst is a thermal cationic polymerization initiator.

5. The plastic lens according to claim 1, wherein the curable composition further contains a vinyl ether compound.

6. The plastic lens according to claim 1, wherein the curable composition further contains a vinyl ether compound having a hydroxyl group.

7. The plastic lens according to claim 1, wherein the vapor deposition coated film is a mirror coating.

8. The plastic lens according to claim 1, wherein the vapor deposition coated film is an antireflective coating.

9. The plastic lens according to claim 1, wherein the vapor deposition coated film is a laminate of a plurality of inorganic layers.

10. The plastic lens according to claim 1, wherein the plastic lens substrate is a polarizing lens.

11. The plastic lens according to claim 1, wherein the plastic lens substrate contains a polarizing lens having a polarizing film and a protective film laminated onto at least one surface of the polarizing film, and the protective film contains an alicyclic polyamide-based resin.

12. The plastic lens according to claim 1, wherein the plastic lens is a lens for eyeglasses or sunglasses.

13. The plastic lens according to claim 1, wherein the molar ratio of the constituent unit represented by Formula (I) to the constituent unit represented by Formula (II) is 20 or greater and 32 or less.

14. The plastic lens according to claim 13, wherein a lower limit of the molar ratio is 21.

15. The plastic lens according to claim 1, wherein the number average molecular weight of the polyorganosilsesquioxane is from 2500 to 4200.

16. Eyeglasses or sunglasses comprising the plastic lens of claim 12.

* * * * *